(12) United States Patent
Shapiro Ilan et al.

(10) Patent No.: US 12,653,194 B2
(45) Date of Patent: Jun. 16, 2026

(54) COMPOSITIONS AND METHODS FOR PROMOTING SOIL MICROBIALS FOR PLANT HEALTH AND STRESS TOLERANCE

(71) Applicants: The United States of America, as represented by The Secretary of Agriculture, Washington, DC (US); Pheronym, Inc., Woodland, CA (US)

(72) Inventors: David I. Shapiro Ilan, Macon, GA (US); Fatma Kaplan, Davis, CA (US)

(73) Assignees: The United States of America, as represented by The Secretary of Agriculture, Washington, DC (US); Pheronym, Inc., Woodland, CA (US)

( * ) Notice: Subject to any disclaimer, the term of this patent is extended or adjusted under 35 U.S.C. 154(b) by 707 days.

(21) Appl. No.: 18/061,528

(22) Filed: Dec. 5, 2022

(65) Prior Publication Data

US 2023/0172212 A1 Jun. 8, 2023

Related U.S. Application Data

(60) Provisional application No. 63/348,093, filed on Jun. 2, 2022, provisional application No. 63/287,118, filed on Dec. 8, 2021.

(51) Int. Cl.
| | |
|---|---|
| *A01N 63/12* | (2020.01) |
| *A01N 43/16* | (2006.01) |
| *A01P 21/00* | (2006.01) |

(52) U.S. Cl.
CPC ............. *A01N 63/12* (2020.01); *A01N 43/16* (2013.01); *A01P 21/00* (2021.08)

(58) Field of Classification Search
None
See application file for complete search history.

(56) References Cited

U.S. PATENT DOCUMENTS

| | | | |
|---|---|---|---|
| 7,374,773 B1 | 5/2008 | Shapiro-Ilan et al. | |
| 8,318,146 B1 | 11/2012 | Teal et al. | |
| 9,534,008 B2 * | 1/2017 | Choe ......................... | A61P 3/10 |
| 2014/0364386 A1 | 12/2014 | Choe et al. | |
| 2016/0037741 A1 | 2/2016 | Klessig et al. | |
| 2016/0183532 A1 | 6/2016 | Taghavi et al. | |
| 2022/0248672 A1 | 8/2022 | Klessig et al. | |

FOREIGN PATENT DOCUMENTS

| | | | | |
|---|---|---|---|---|
| CN | 102640731 | 8/2012 | | |
| EP | 2967052 | 9/2014 | | |
| GB | 2581540 A * | 8/2020 | ............... | A01P 7/04 |
| WO | 2014145380 A2 | 9/2014 | | |
| WO | 2017120252 A1 | 7/2017 | | |
| WO | 2021007280 A1 | 1/2021 | | |

OTHER PUBLICATIONS

Stock, S.P., et al., "The bacterial symbionts of entomopathogenic nematodes and their role in symbiosis and pathogenesis," Journal of Invertebrate Pathology, vol. 211, pp. 1-11 (2025).*
Kaplan F., et al., 2012, "Interspecific nematode signals regulate dispersal behavior," PLoS ONE 7: e38735.
Oliveira-Hofman C., et al., 2019, "Pheromone extracts act as boosters for entomopathogenic nematodes efficacy," J. Invertebr. Pathol. 164: 38-42.
Srinivasan J. et al. (2008, "A blend of small molecules differentially regulates both mating behavior and development in Caenorhabditis elegans," Nature 454: 1115-1118.
Shapiro-Ilan, D.I., et al., 2012, "Entomopathogenic Nematode Production and Application Technology" J. Nematol. 44 (2): 206-217.
Inman III. F.L., et al., 2012, "Mass Production of the Beneficial Nematode Heterorhabditis bacteriophora and Its Bacterial Symbiont Photorhabdus luminescens," Indian J. Microbiol. 52: 316-324.
Klessig, D. F. et al., 2019, "Nematode ascaroside enhances resistance in a broad spectrum of plant-pathogen systems," J. Phytopath.: 1-9.
International Search Report on PCT/US2022/051939 issued Jun. 7, 2023.
Written Opinion on PCT/US2022/051939 issued Jun. 7, 2023.
Murli Manohare et al., Plant metabolism of nematode pheromones mediates plant-nematode interactions, Nature Communications, 2020.
Patricia Manosalva et al.,Conserved nematode signalling molecules elicit plant defenses and pathogen resistance, Nature Communications, Jul. 23, 2015.
Jagan Srinivasan et al., A blend of small molecules regulates both mating and development in Caenorhabditis elegans, Nature, vol. 454, Aug. 2008.
Wu Shaohui et al: "Infected host macerate enhances entomopathogenic nematode movement towards hosts and infectivity in a soil profile", Journal of Invertebrate Pathology, Nov. 1, 2018 (Nov. 1, 2018), vol. 159, pp. 141-144.

* cited by examiner

*Primary Examiner* — John Pak
(74) *Attorney, Agent, or Firm* — John Fado; Maria Restrepo-Hartwig

(57) ABSTRACT

The disclosure relates to pheromone extracts from nematode growth medium, and methods of using such nematode extracts to increase the abundance of fungal and bacterial microbials in the soil to promote plant growth, plant health, and to protect plants from environmental stresses including abiotic and biotics stresses.

4 Claims, 13 Drawing Sheets

COMPOSITIONS AND METHODS FOR PROMOTING SOIL MICROBIALS FOR PLANT HEALTH AND STRESS TOLERANCE

REFERENCE TO RELATED APPLICATIONS

This application claims the benefit of U.S. Provisional Application No. 63/287,118 filed Dec. 8, 2021, and U.S. Provisional Application No. 63/348,093 filed Jun. 2, 2022. The contents of these provisional patent applications is hereby expressly incorporated by reference in their entirety.

FIELD OF THE INVENTION

The disclosure relates to compositions and methods to promote the growth or increase the abundance of fungal and/or bacterial microbials in the soil. The fungal and/or bacterial microbials in the soil will promote plant growth, and/or plant health, and will protect plants from environmental abiotic and/or biotics stresses.

BACKGROUND OF THE INVENTION

Environmental stresses arise from conditions that are unfavorable for the optimal growth and development of organisms. Environmental stresses can be classified either as abiotic or biotic. Abiotic stresses are produced by inappropriate levels of physical components of the environment such as temperature extremes (high, low, and freezing temperatures), drought/water deficit, flooding, lack of oxygen, salinity, low light, excess light, UV radiation, or oxidative stresses. Biotic stresses are caused by pathogens, parasites, predators, and/or other competing organisms.

The ability of most organisms to survive and recover from unfavorable conditions is a function of basal and induced tolerance mechanisms. Induced stress tolerance results from a complex process involving several physiological and biochemical changes, including changes in membrane structure and function, tissue water content, global gene expression, protein, lipid, and primary and secondary metabolite composition. Advances in genome sequencing and global gene expression analysis techniques have further established the multigenic quality of environmental stress responses and the complex nature of temperature acclimation. Literally hundreds of genes have been linked with environmental stress responses. No single gene or single compound can create a stress tolerance.

In addition to plant basal and induced plant tolerance, soil microbials play an important role in plant growth, health, and environmental stress tolerance. They can do that either directly or indirectly. Soil microbials can directly act on pests (insect, nematode, fungi, or bacteria) by parasitizing them. Microbials promote plant stress tolerance indirectly by producing plant stress hormones to induce plant abiotic or biotic stress tolerance. For example, the soil microbial *Trichoderma* species are saprotrophic fungi commonly found in plant-associated environments such as forest soil, roots, and leaves. *Trichoderma* exhibit effects through suppression of bacterial and fungal pathogens by secreting antibiotic compounds and mycoparasitic activity on pathogenic fungi. *Trichoderma* have beneficial effects on plants by promoting growth, development, productivity, and resistance to abiotic stress. *Trichoderma* can modulate the plant hormonal network as well as produce phytohormones (jasmonic acid (JA), auxin (indole-3-acetic acid: IAA), cytokinins (CK), gibberellins (GA), ethylene (ET), abscisic acid (ABA) and salicylic acid (SA)) all of which are involved in plant growth, development, and environmental stress tolerance by themselves or in a mixture thereof.

Thus, new compositions and methods of promoting the growth or increasing the abundance of fungal and bacterial microbials in the soil to promote plant growth, plant health, and plant protection from environmental stresses including abiotic and biotics stresses are needed.

SUMMARY OF THE INVENTION

Provided herein is a nematode growth medium extract (dry or liquid) to treat plant seeds or seedlings (transplants) in controlled plant growth environment (e.g., greenhouse, indoor agriculture) application, in application in the field as seed treatment, root dips for transplants before planting to the field, or in irrigation water for specialty crops as annuals (vegetables, ornamentals, etc.) and perennials (trees or fruit and nut orchards, etc.) at planting, post planting or anytime during growth season to plant and/or surrounding environment to promote soil microbials that improve plant growth and health and plant tolerance to environmental stresses. Examples of these environmental stresses (abiotic and biotic stresses) include a drought/water deficit, a low temperature/cold stress, a freezing stress, a high temperature/heat stress, a salt/salinity stress, a low or excessive light, a shading stress, an oxidative stress, an ultraviolet (UV) radiation, a cosmic radiation, a lack of oxygen conditions, a flooding, a heavy metal stress, pathogens (bacteria, fungi), insects, virus. These soil microbials can include bacteria, fungi that directly parasitize plant pests, or produce antibiotics to suppress pathogens, produce elicitors to induce plant immunity, or modulate plant hormone network or directly produce plant hormones for environmental stress tolerance. Methods of manufacture, including purification, storage as dry powder, use are disclosed for preservation, use with other soil macro-organisms and microbials and use for promoting soil microbial abundance that promote plant growth, health and tolerance to abiotic and biotic stresses.

BRIEF DESCRIPTION OF THE DRAWINGS

FIG. 1A and FIG. 1B depict structures of ascaroside pheromones. FIG. 1A shows the general structure of ascaroside pheromones where R1=H or CH3; R2=OH, CH3, N-EA, or N-PABBA; R3=OH or O-beta glc; R4=OH, O-ICA, O-IAA, or O-ascr; and n=1, 2, 3, 4, 5, 6, 7, 8, 9, 10, or 11. N—: N linked; O—: O linked; EA: ethanolamine; PABA: para-amino benzoic acid; ICA: indole carboxylic acid; IAA: indole acetic acid; beta glc: beta glucose; ascr: ascaroside. FIG. 1B shows the structures of ascarosides and their analogs found in nematode growth medium: ascr #1, ascr #2, ascr #3, ascr #5, ascr #7, ascr #8, ascr #9, ascr #11, oscr #9, and icas #9.

FIG. 2A to FIG. 2D depict images of pheromones and their profile during development. FIG. 2A shows the structure of ascaroside pheromones ascr #9 and ascr #11 found in EPN infected insect host cadavers. FIG. 2B shows an image of a consumed insect host cadaver with emerging *S. carpocapsae* IJs. FIG. 2C shows an image of a consumed insect host cadaver with dispersing *S. feltiae* IJs. FIG. 2D shows a graph of the scr #9 and ascr #11 profile during *S. feltiae* development. For each time point, six insect cadavers were analyzed by LC-MS. For the 0-time point, 4 uninfected larvae were analyzed. An asterisk (*) indicates that ascaroside was detected but not quantifiable. The arrow (Dispersing) indicates the onset of infected juvenile emergence.

FIG. 3A presents a phylogenetic tree for entomopathogenic nematodes, plant parasitic nematodes, and *C. elegans*. The figure is adapted from *C. elegans* and the biology of nematodes. The example of genera is indicated by an asterisk (*). FIG. 3B presents LC-MS graphs of the host insect cadaver of *Steinernema* spp. and *Heterorhabditis* spp. For each species, four insect (*G. mellonella*) cadavers infected with both *Steinernema* spp. or *Heterorhabditis* spp. were analyzed by LC-MS for ascr #9 and ascr #11 profiles.

FIG. 4A shows a graph of the effects of *Steinernema carpocapsae* pheromone extracts together with *S. carpocapsae* IJs on soil fungal abundance over a 6 week-period in a peach orchard. FIG. 4B shows a graph of the effect of *S. carpocapsae* IJs on the soil fungi. FIG. 4C shows a graph of the Chlorpyrifos effects on the soil fungi. IJs density is 300,000 IJs/per tree surrounding 15 cm distance from each tree. Sc. Pheromones extracts were 16 times-diluted (0.0625×) and placed in 300 ml of water. Untreated control is water. Each circle, square, or triangle represents a treatment and replication. Data points on two left ovals represent 2 weeks after the treatment, data points in the two center ovals represent 4 weeks after the replication, and data points in the far-right oval represents 6 weeks after the treatment. Sc IJs: *S. carpocapsae* infective juveniles, Sc Pher Ext: *S. carpocapsae* pheromone extracts, CFP: Chlorpyrifos, PC1 and PC2: principal component 1 and 2.

FIG. 6A presents a flowchart of the pheromone extracts and combinations (top row), their application to the plant or plant part (center), and the re-application timing (bottom row). FIG. 6B presents a flowchart of the field application of EPN IJs.

FIG. 8A presents the percent change in microbial abundance for methanogenesis and FIG. 8B presents the percent change in microbial abundance for carbon fixation (C-fixation). The Y axis shows the percentage change. The X axis shows the different treatments: EPN Sc=*S. carpocapsae* IJs only; EPN Pheromone Sc=pheromone extracts from *S. carpocapsae* host cadavers+ *S. carpocapsae* IJs; Pheromone Sc=pheromone extracts from *S. carpocapsae* host cadavers; EPN Sf SN=*S. feltiae* IJs only; EPN Pheromone Sf SN=pheromone extracts from

*S. feltiae* SN host cadavers+*S. feltiae* IJs; Pheromone Sf SN=pheromone extracts from *S. feltiae* SN host cadavers.

Figure 9A:
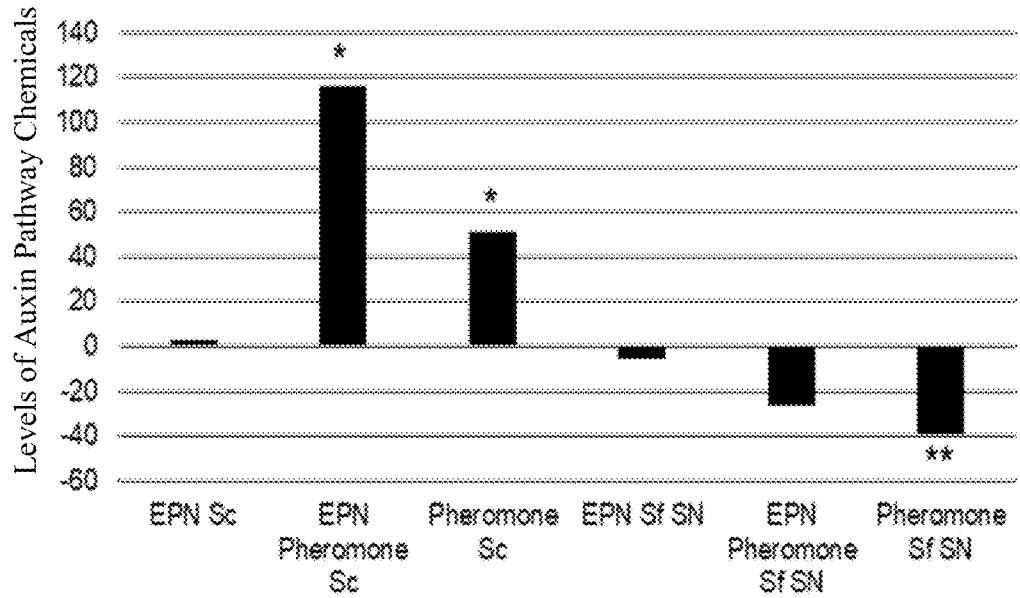
Figure 9B:
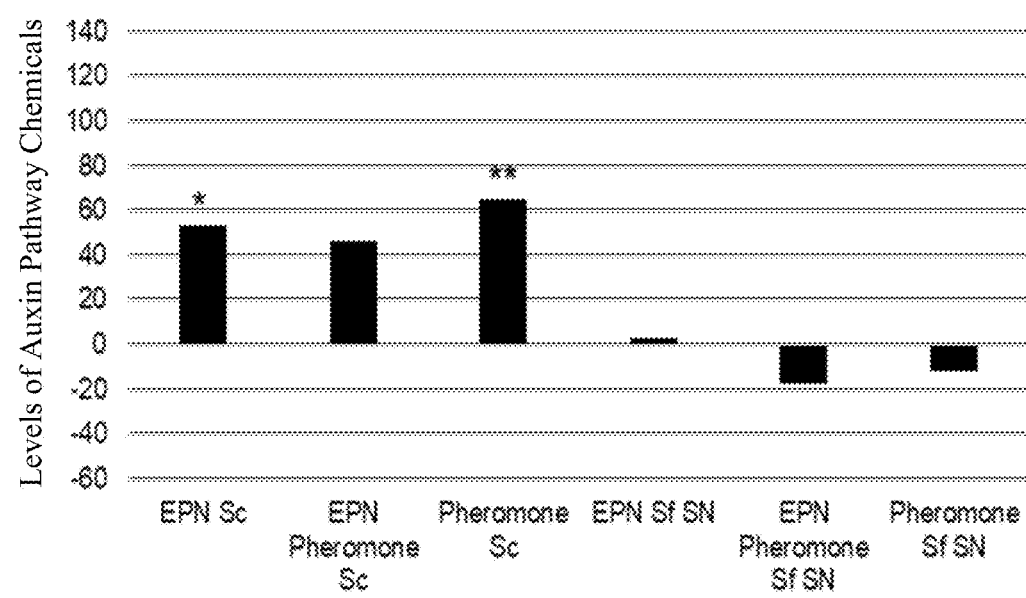

FIG. 9A and FIG. 9B depict the levels of microbial abundance for auxin pathway chemicals 14 and 28 days after treatment. FIG. 9A shows the levels of microbial abundance for auxin pathway chemicals 14 days after treatment (T1) and FIG. 9B shows the levels of microbial abundance for auxin pathway chemicals 28 days after treatment (T2). The Y axis shows the levels of auxin pathway chemicals compared to control. The X axis shows the different treatments: EPN Sc=*S. carpocapsae* IJs only; EPN Pheromone Sc=pheromone extracts from *S. carpocapsae* host cadavers+ *S. carpocapsae* IJs; Pheromone Sc=pheromone extracts from *S. carpocapsae* host cadavers; EPN Sf SN=*S. feltiae* IJs only; EPN Pheromone Sf SN=pheromone extracts from *S. feltiae* SN host cadavers+*S. feltiae* IJs; Pheromone Sf SN=pheromone extracts from *S. feltiae* SN host cadavers. (*=p-value 0.1-0.3; **=p-value<0.1 compared with control)

Figure 10A:
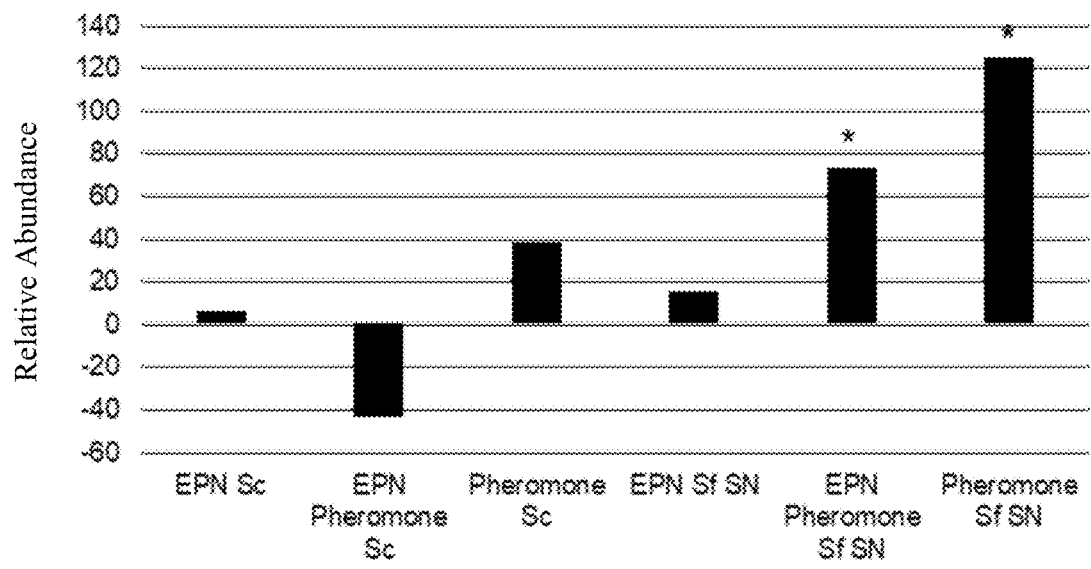
Figure 10B:
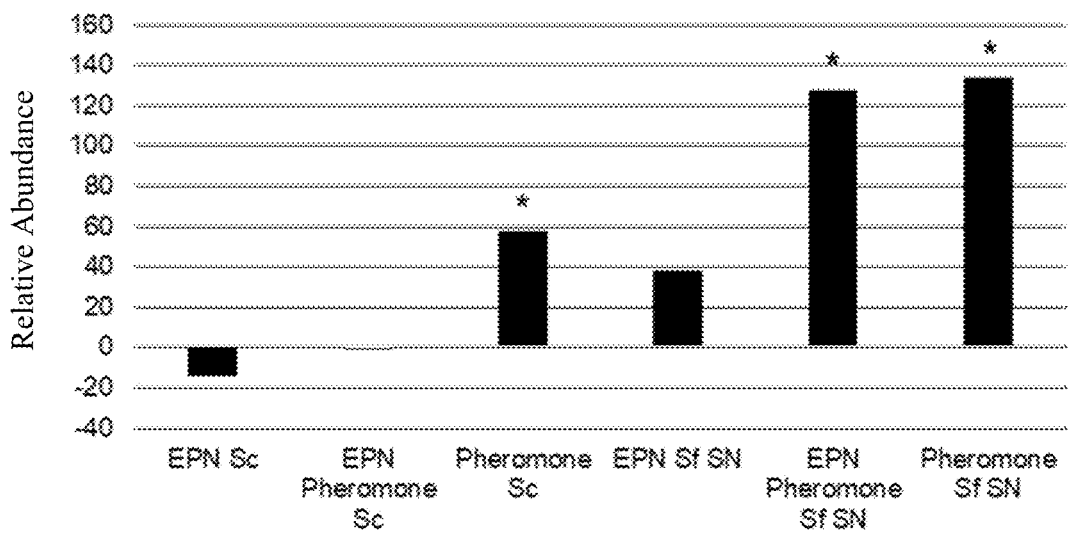

FIG. 10A and FIG. 10B depict the levels of microbial abundance for abscisic acid 14 and 28 days after treatment. FIG. 10A shows the levels of microbial abundance for abscisic acid 14 days after treatment (T1) and FIG. 10B shows the levels of microbial abundance for abscisic acid 28 days after treatment (T2). The Y axis shows the levels of microbial abundance for abscisic acid compared to control. The X axis shows the different treatments: EPN Sc=*S. carpocapsae* IJs only; EPN Pheromone Sc=pheromone extracts from *S. carpocapsae* host cadavers+*S. carpocapsae* IJs; Pheromone Sc=pheromone extracts from *S. carpocapsae* host cadavers; EPN Sf SN=*S. feltiae* IJs only; EPN Pheromone Sf SN=pheromone extracts from *S. feltiae* SN host cadavers+*S. feltiae* IJs; Pheromone Sf SN=pheromone extracts from *S. feltiae* SN host cadavers.

Figure 11:
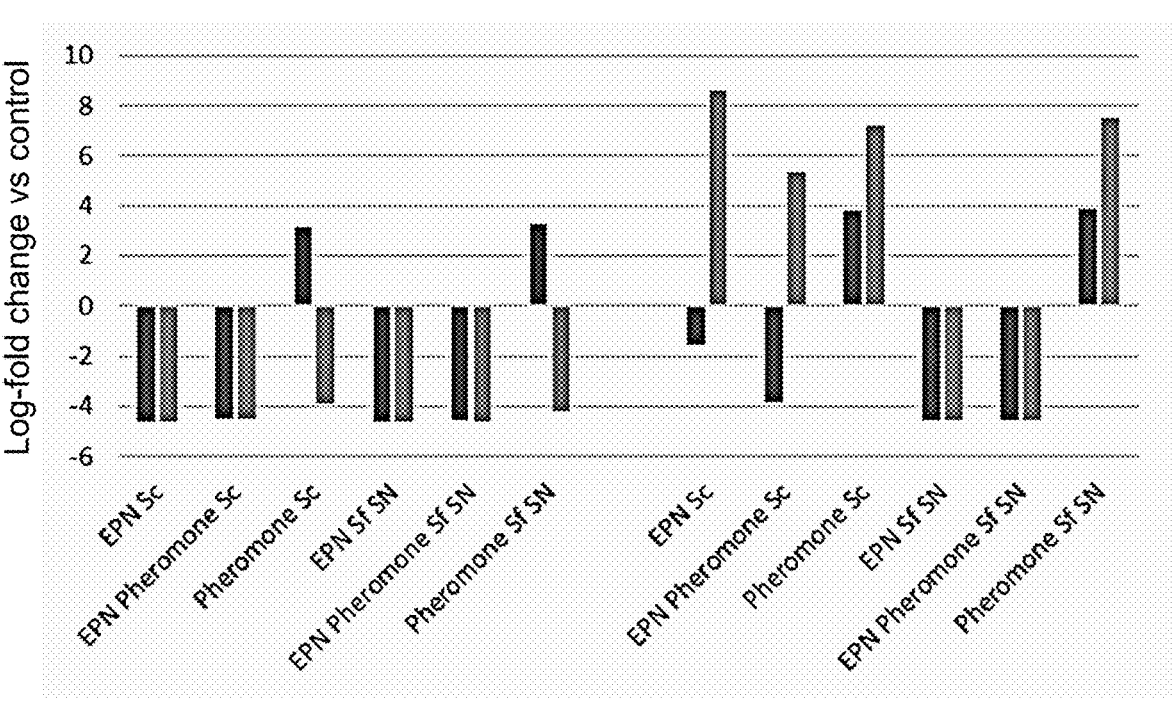

FIG. 11 depicts the log-fold change in Green Fruit Rot and *Botrytis* at 14 days (blue) and 28 days (yellow) post treatment. The Y axis shows the levels of abscisic acid compared to control. The X axis shows the different treatments: EPN Sc=*S. carpocapsae* IJs only; EPN Pheromone Sc=pheromone extracts from *S. carpocapsae* host cadavers+ *S. carpocapsae* IJs; Pheromone Sc=pheromone extracts from *S. carpocapsae* host cadavers; EPN Sf SN=*S. feltiae* IJs only; EPN Pheromone Sf SN=pheromone extracts from *S. feltiae* SN host cadavers+*S. feltiae* IJs; Pheromone Sf SN=pheromone extracts from *S. feltiae* SN host cadavers. In each pair of bars, the bar to the left indicates data from T1 (14 days after treatment) and the bar to the right indicates T2 (28 days after treatment).

DETAILED DESCRIPTION

The disclosure relates compositions and methods to promote the growth or increase the abundance of fungal and/or bacterial microbials in the soil. The fungal and/or bacterial microbials in the soil will promote plant growth, plant health, and will protect plants from environmental abiotic and/or biotics stresses.

Prior to the present disclosure it was not easily seen, recognized, or understood that nematode pheromones found in nematode growth medium would promote soil microbials that improve plant growth and health and plant tolerance to environmental stresses or parasitize plant pests. Previously, it has not been shown that beneficial nematodes by themselves and/or together with nematode pheromone extracts promote soil microbials. It was unexpected that beneficial nematodes would increase the soil microbial abundance, as long as, for example, 2 weeks, after soil applications. It was very surprising that to see the effect of pheromone extracts on the beneficial soil microbiome lasted for example, as long as 4 weeks. Prior to the present disclosure, it was not known how to obtain the signal, how to preserve the activity, or how to deploy the activity to commercial advantage to promote soil microbials. Similarly, the frequency of application of the composition of the disclosure in the field resulting in promotion of soil microbials was not known or recognized.

Figures 1A, 1B:
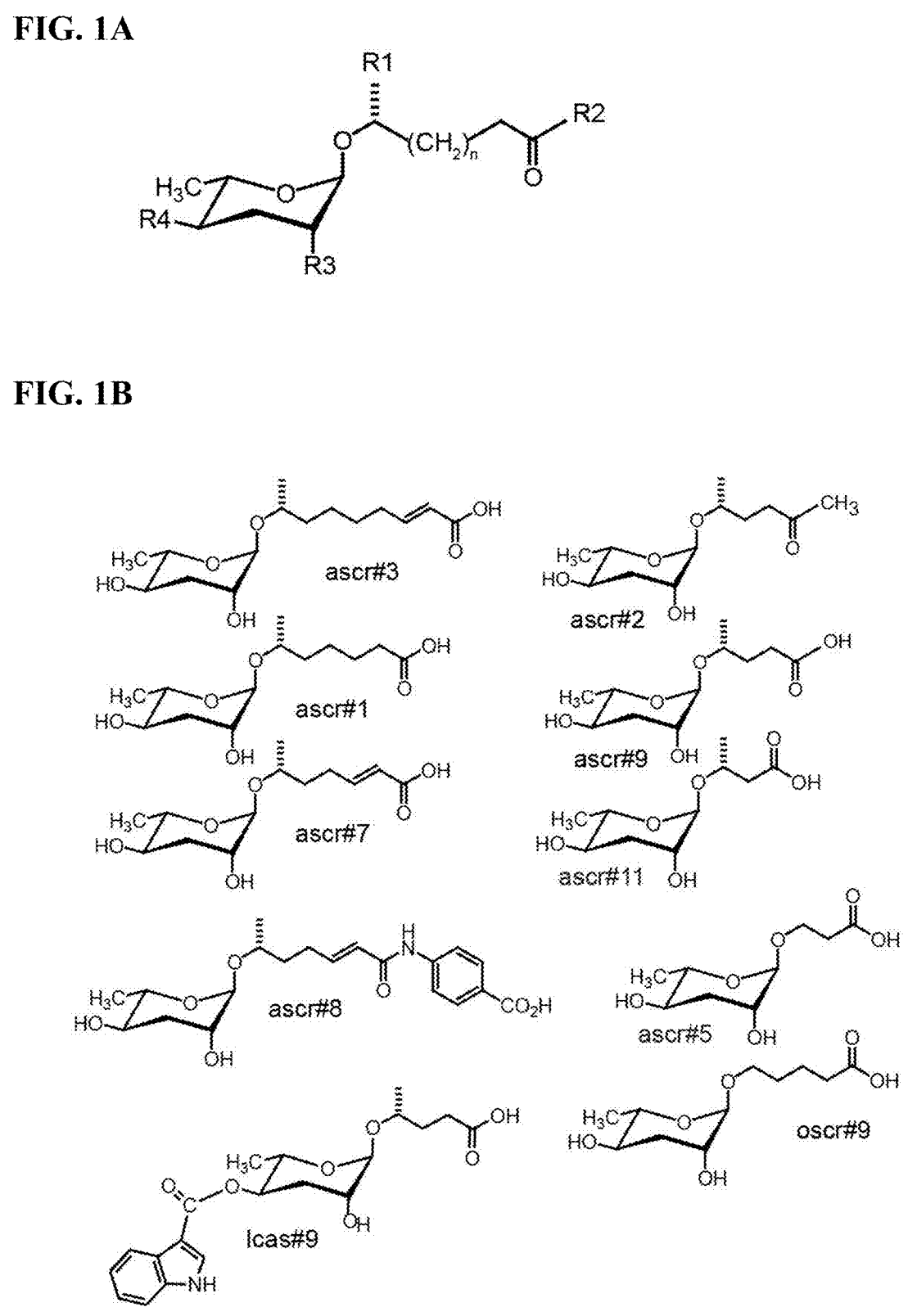
Figure 2A:
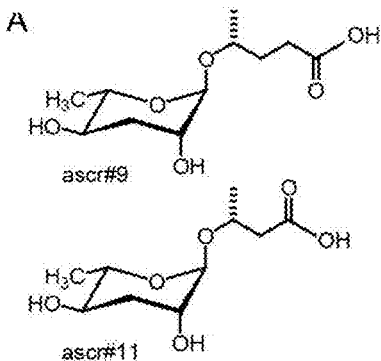
Figure 2A:
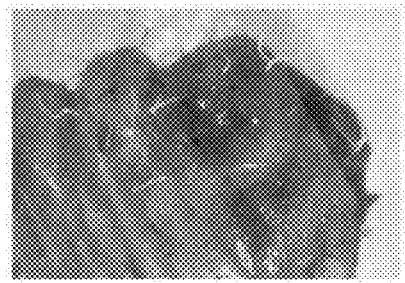
Figure 2A:
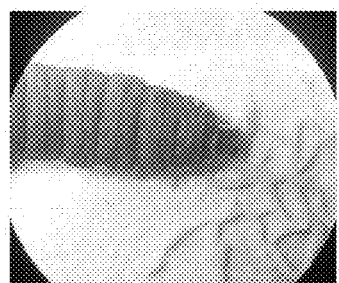
Figure 2D:
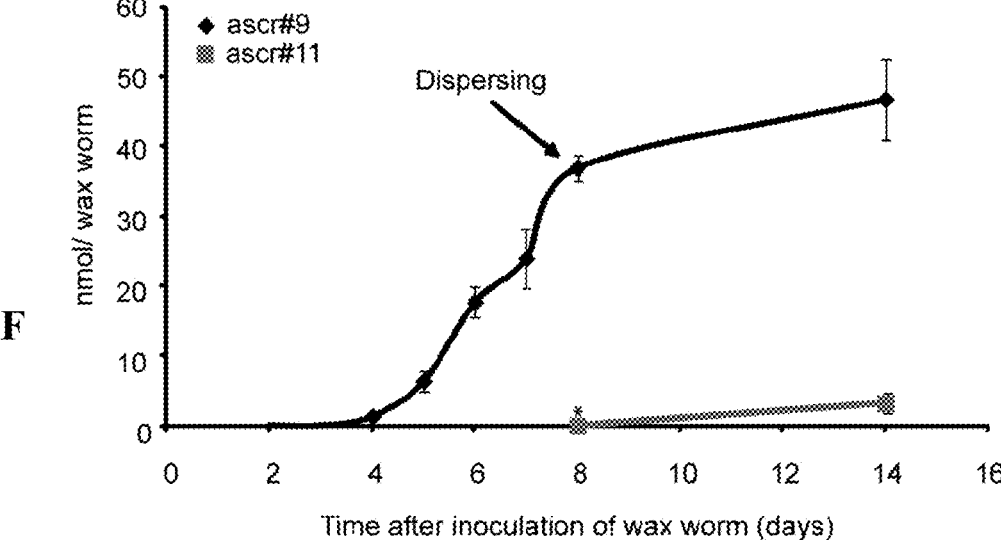

The inventors previously reported on the development of a nematode pheromone extraction method to stimulate beneficial nematode dispersal behavior to improve beneficial nematodes' efficacy for insect pest control and showed that the dispersal behavior was controlled by a mixture of nematode pheromones called ascarosides (Kaplan F., et al., 2012, "Interspecific nematode signals regulate dispersal behavior," *PLoS ONE* 7: e38735; and Oliveira-Hofman C., et al., 2019, "Pheromone extracts act as boosters for entomopathogenic nematodes efficacy," J. Invertebr. Pathol. 164: 38-42). As seen in FIG. 1A and FIG. 1B, ascarosides are a class of compounds composed of a central ascarylose sugar with a variable lipid side chain, and both the lipid chain and ascarylose sugar can have modifications. As seen in FIG. 2D, the concentration of the pheromones increases with the nematode development and peaks right before they turn into infective juveniles (Dispersing) which leave the consumed cadaver. The inventors also showed that the phylogenetically related nematode species, *Steinernema* and *Heterorhabditis* species, produce common ascarosides (ascr #11 and ascr #9) which they release to their host cadavers (see FIG. 3A and FIG. 3B).

Prior to this disclosure, it was not known whether nematode released pheromones in the nematode growth medium were promoting growth of soil microbials that promote plant growth and health or protect plants from environmental stresses directly or indirectly. These soil microbials can control plant pests including plant parasitic nematodes (root-knot nematode, soybean cyst nematode), insects or plant pathogens (fungal or bacterial pathogens). Microbials can directly parasitize the plants pests or produce antibiotics to suppress plant pathogens. These microbials can indirectly protect plants from pests and improve plant health by modulating plant hormones for nutrient uptake or plant defense. Alternatively, microbials produce plant hormones that improve plant growth and stress tolerance to abiotic and biotic stresses.

Disclosed herein are compositions, methods of making such compositions, and methods of using the compositions to promote microbial growth that: (1) parasitize plant parasitic nematodes, insects, fungi, and bacteria, (2) suppress plant pathogens, and (3) promote microbials that produce phytohormone that induce plant biotic and abiotic stress tolerance for a period of at least about 2 to 4 weeks.

Figure 7:
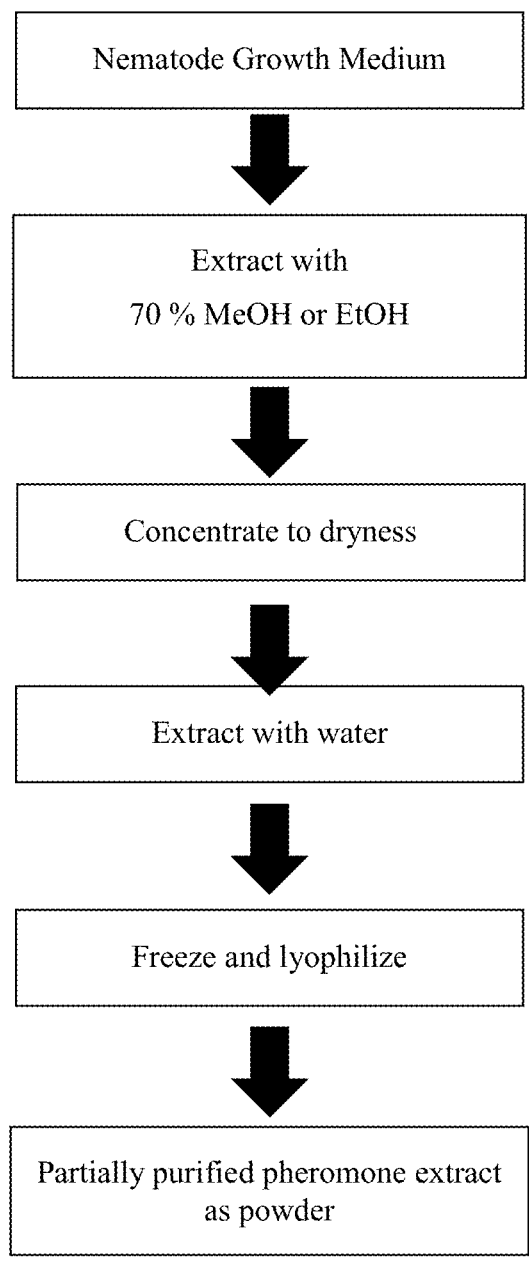
FIG. 7 depicts a flow chart of the pheromone extract purification procedure from nematode growth medium.

The inventors surprisingly found that treatment with pheromone extracts with beneficial nematodes, pheromone extracts, and beneficial nematodes by themselves promotes soil microbials that improves plant growth, plant health, and induces plant tolerance to abiotic and biotic stress either through parasitizing the pests and pathogens or producing phytohormones for plant stress tolerance or inducing plant hormones for stress tolerance. The pheromone composition disclosed and claimed herein may be partially purified from nematode growth medium, including but not limited to, insects, liquid broth, or agar plates. As shown in FIG. 7, the pheromones were extracted using water or an alcohol, such as but not limited to, 70% methyl alcohol, ethyl alcohol, and/or combinations thereof, and centrifugation to remove insoluble debris.

The pheromone can be extracted with alcohol in a concentration range from about 0% to about 95%. The liquid (supernatant) may be removed and concentrated to produce a dry extract by using a stream of nitrogen, by rotary evaporation, by lyophilization, or by any equivalent means. The dry powder may be resuspended in water and centrifuged to separate insoluble debris from water-soluble pheromones. For storage the supernatant may be concentrated to dryness using a lyophilizer, a spray drier, or any equivalent means. The concentration and ratio of the pheromone mixture was evaluated for its activity on plants. For example, when the extract was diluted up to about 16 times with insect host cadaver equivalent (0.0625×HCE) from the physiologically relevant concentration 1×HCE it promoted soil microbials that promoted plant health and growth and protected the plants from soil pests by parasitizing plant parasitic nematodes, insects, pathogenic fungi or bacteria, by suppressing plant pathogens by producing antibiotics, by inducing plant stress tolerance by producing phytohormones, or by priming the plant stress tolerance pathways. In addition, for example, one insect host cadaver extract from *Galleria mellonella* (average weight of *G. mellonella* larvae, wax worm, is estimated to be approximately 232+/−57 mg) is diluted in 200 µL water which is physiologically relevant concentration as 1×HCE. When one insect host cadaver extract from *Galleria mellonella* is resuspended in 3200 µL (about 16 times dilution or 0.0625×HCE). Total 34 HCE *S. carpocapsae* pheromone extracts with 300,000 *S. carpocapsae* IJs in 110 mL of water in 15 cm soil surrounding the tree trunk. Then an additional 190 mL of water was added to the 15 cm of soil surrounding the tree trunk. Additional treatments included *S. carpocapsae* IJs only (88 Ijs/cm²) where 300,000 IJs in 110 mL of water placed in 15 cm soil surrounding the tree trunk or chemical treatment Chlorpyrifos (Lorsban) was applied as per the manufacturers' recommendation.

Figure 5:
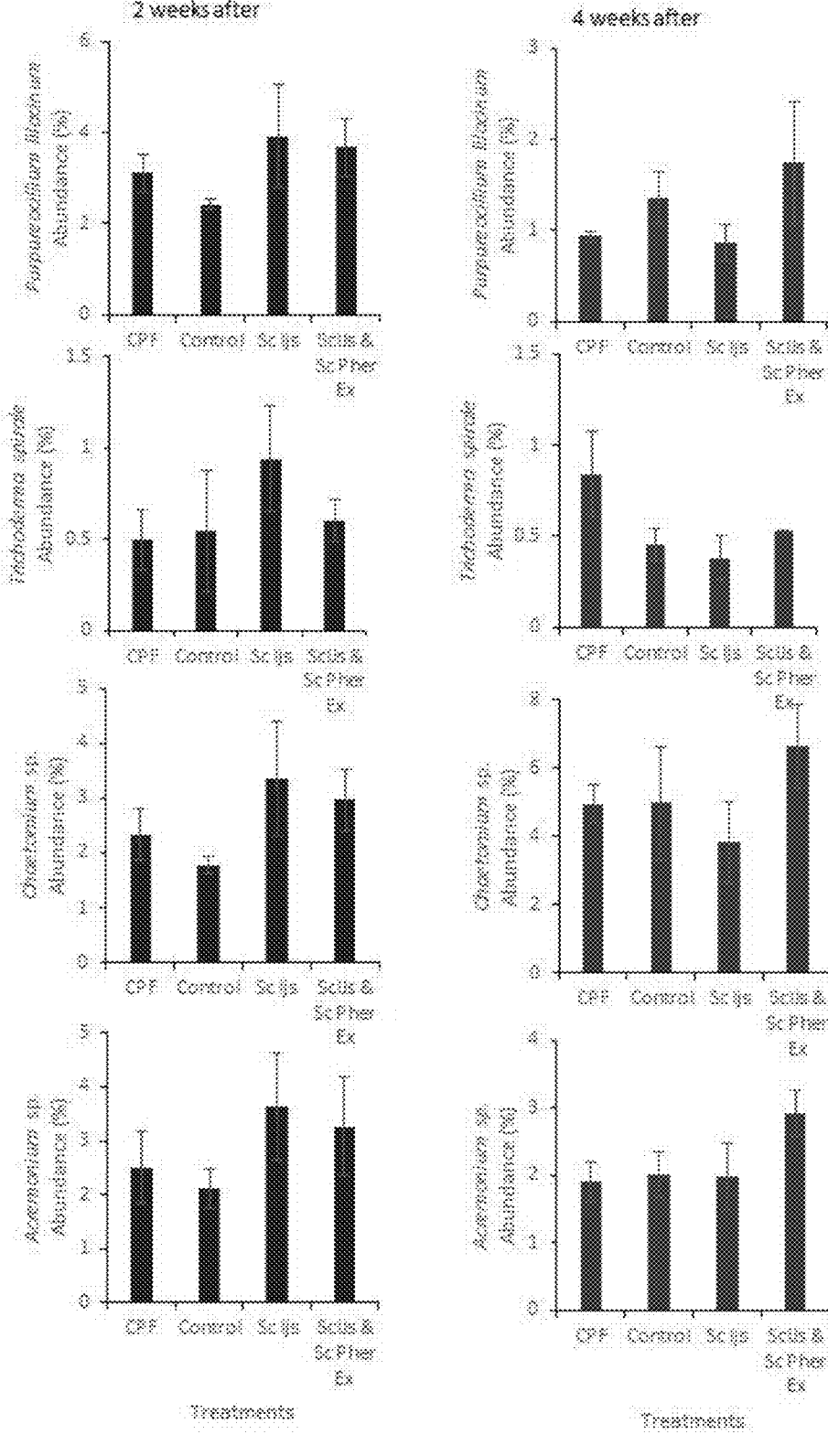
FIG. 5 depicts graphs of the abundance of soil microbials at 2 and 4 weeks after chemical and biological treatments. The soil microbiome was selected from the top 25 fungi contributing to PCA components 1 and 2 (*Purpureocillium lilacinum, Trichoderma spirale, Chaetomium* sp. and *Acremonium* sp.). Chemical treatment is chlorpyrifos and biological treatment is either *S. carpocapsae* IJs only or *S. carpocapsae* IJs with pheromone extracts. The mean±s.e.m. of 4 replications is presented. Sc IJs: *S. carpocapsae* infective juveniles, Sc Pher Ext: *S. carpocapsae* pheromone extracts, CFP: Chlorpyrifos
Figure 6A:
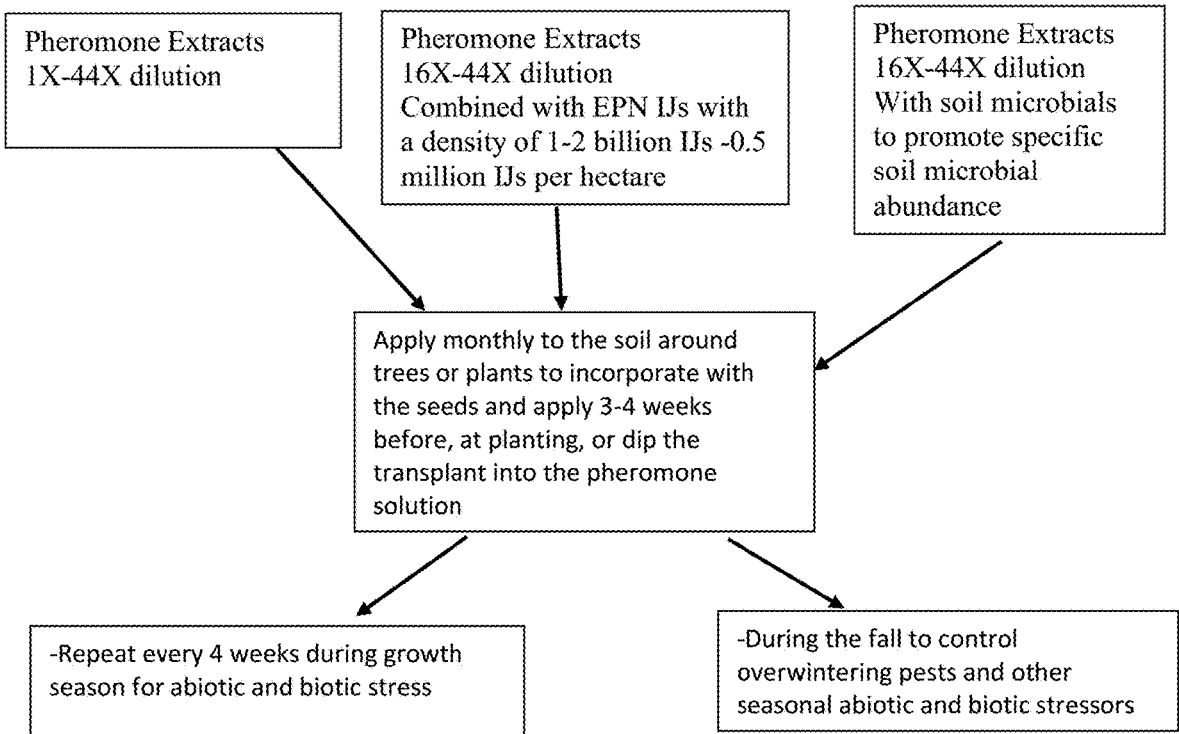
FIG. 6A and FIG. 6B depict flowcharts of the Application of compositions to promote soil microbials growth/abundance in the soil around the plants and plant rhizosphere for plant growth health and protection from abiotic and biotic stresses.
Figure 6B:
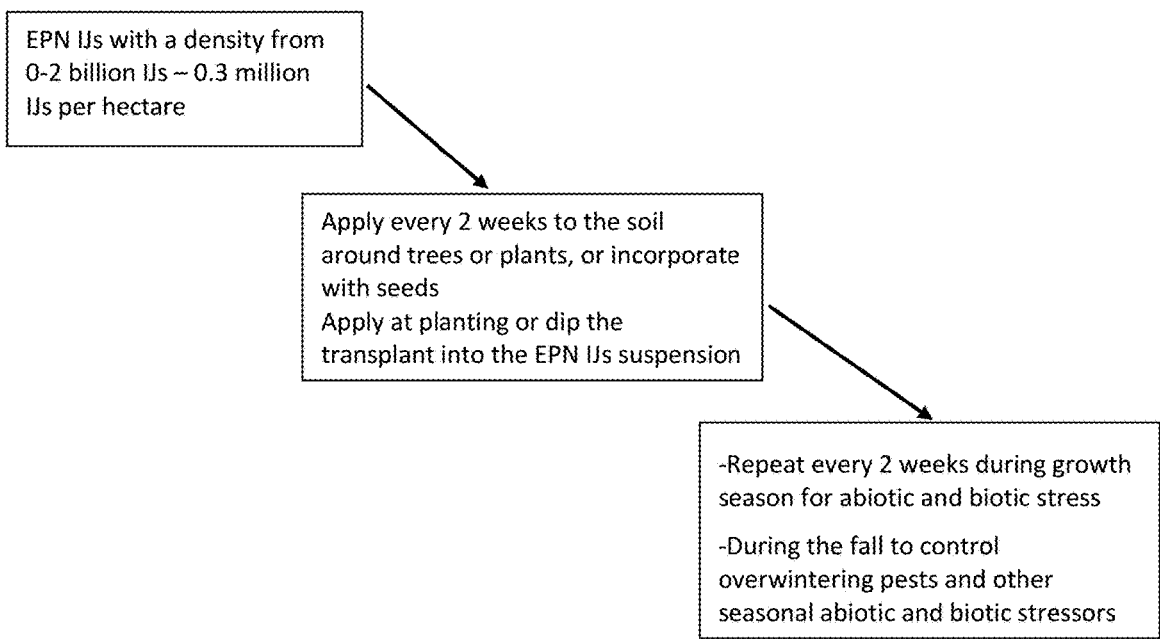

The extracts are not limited to *G. mellonella*. Insect host pre-infected weight is considered 1× for extract dilution, and up to about 16 times of the original weight of the extract is active. For the liquid broth, a 1 L growth medium where the food (as bacteria) density goes down and nematode density goes up and the IJs or analogous life stage (e.g., dauer in *C. elegans*) forms, the media contains dispersal pheromone. As seen in FIG. 5 and Table 2, when this media is diluted to about 16 to about 44 times, it promotes soil microbials that protect plants from pests and pathogens and that induces plant fitness/tolerance to abiotic stress, by producing plant hormones or inducing or priming plant defense against environmental stresses. One L liquid broth extract (dry powder) is diluted with 1 L water up to 16 L or 44 L of water. According to one embodiment of the disclosure, seedlings or transplants are treated with resuspended powder for at least about one minute prior to field applications. In alternate embodiments, the resuspension time can be adjusted. Further in alternate embodiments, the resuspended extract is placed in drip irrigation system with or without fertilizers or pesticides and applied to the field.

Pheromone extracts diluted about 16 to about 44 times can also be applied to seeds as seed treatment or pellets during planting to promote soil microbials to induce plant stress tolerance to spring freezes or unexpected drought conditions. They are applied to a field with commercially available apparatus.

Exemplary methods of making and using the nematode pheromone extract compositions are described below.

Figure 3A:
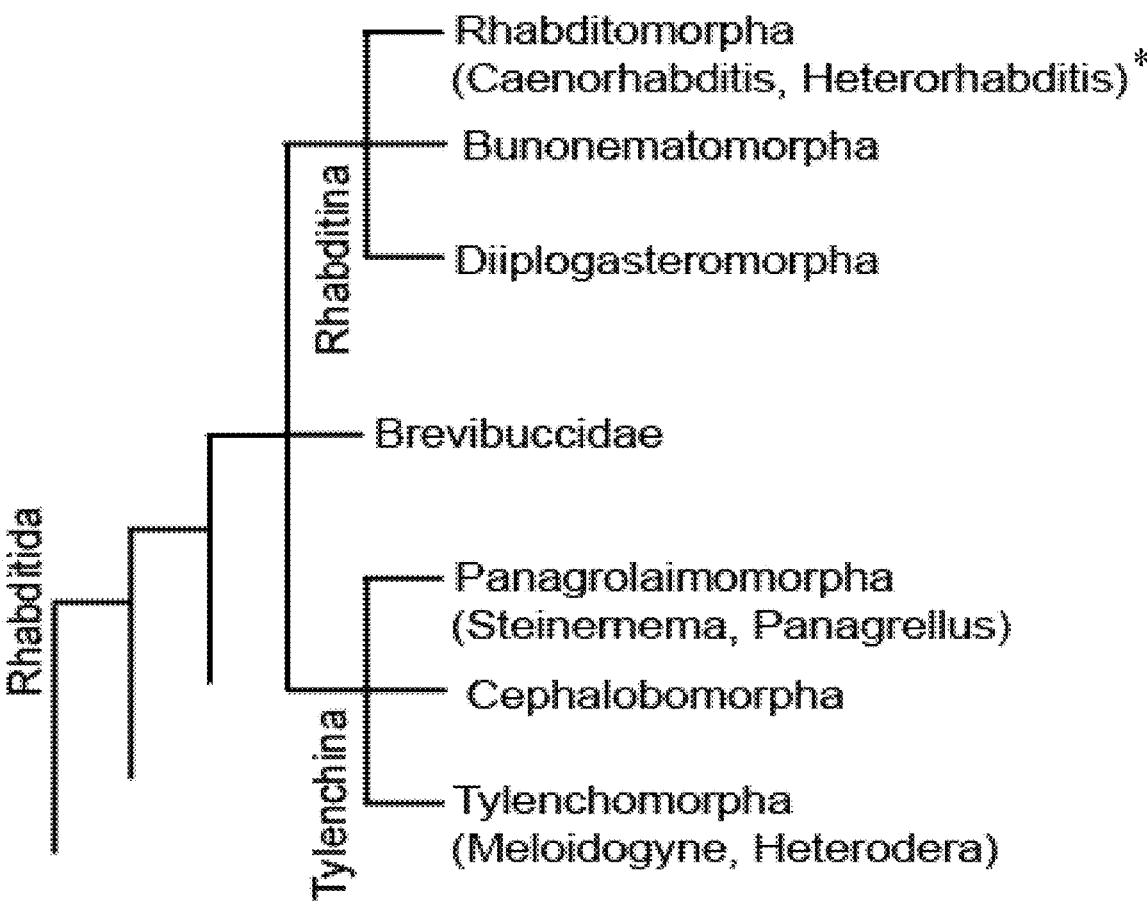
FIGS. 3A and 3B depict a nematode phylogenetic tree and LC-MS graphs of the pheromone extract dispersal in host insect cadavers.

A schematic of the purification procedure is shown in FIG. 7. In an embodiment, a ratio of alcohol (EtOH or MeOH) per nematode consumed insect host cadaver may be about 1:1 (1 mL of 70% EtOH or MeOH per insect cadaver); the effective concentration range may be about 0% to about 95% alcohol. The insect cadavers are homogenized or mixed well with alcohol. Samples are centrifuged and the super-natant is concentrated to dryness via lyophilization or equivalent means. The samples are then extracted with water and centrifuged to separate insoluble compounds. The super-natant is frozen and dried by lyophilization or equivalent means. Using LC-MS the inventors previously showed that these extracts include detectable amounts of nematode pheromones (see FIG. 2D) such as ascr #9 and ascr #11. As shown in FIG. 3A, ascr #9 and ascr #11 are common to phylogenetically related entomopathogenic nematode spe-cies. The dry powder may be stored either at ambient temperature or in a freezer. If pheromone extracts are stored in liquid, the activity (using assays for nematode dispersal behavior which is in response to pheromones) will be lost with about 7 to about 10 days at room temperature.

Figure 4A:
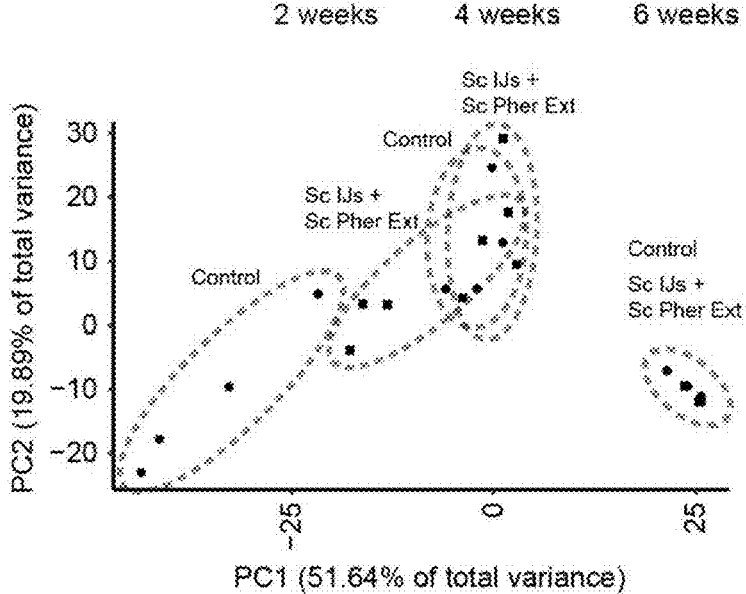
FIG. 4A to FIG. 4C depict graphs of the principal component analysis for the effects of chemical and biological treatments on soil fungi over a 6 week-period.
Figure 4B:
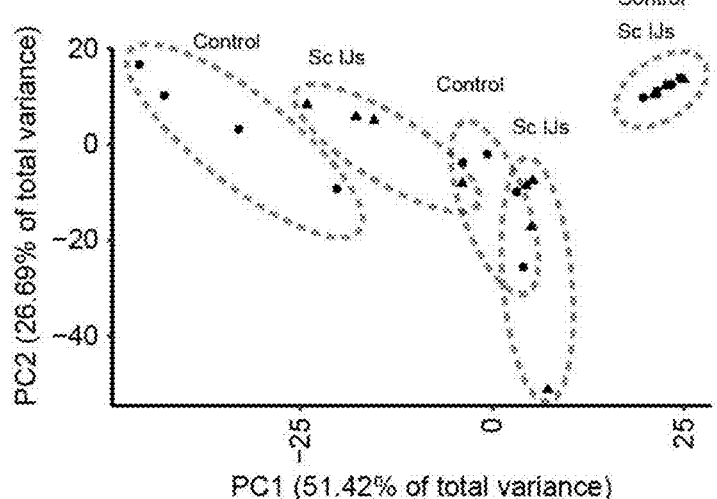
Figure 4C:
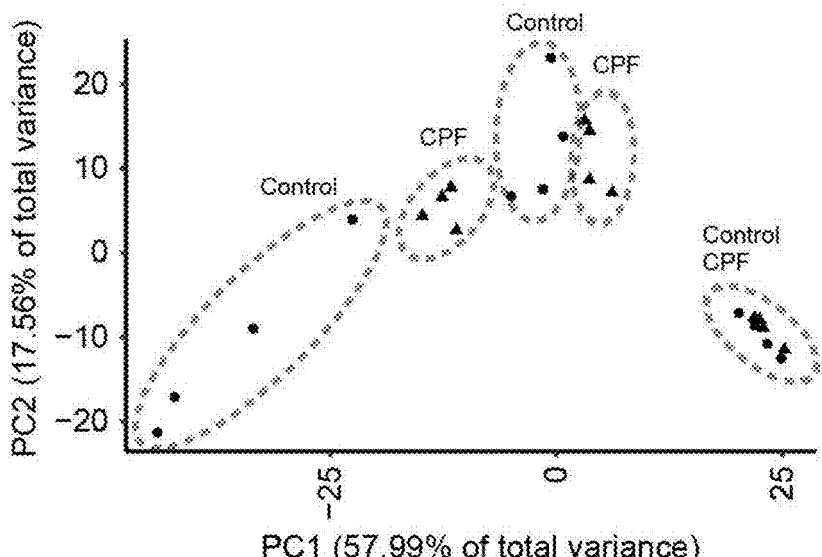

In field trials, about 16× dilution *S. carpocapsae* phero-mone extract (34 HCE) with 300,000 *S. carpocapsae* IJs were applied in 110 mL of water to a 15 cm area surrounding the tree trunk and further supplemented with 190 mL of water. This treatment promoted soil microbials for 4 weeks. In contrast, when the 300,000 *S. carpocapsae* IJs were applied in 110 mL of water to a 15 cm area surrounding the tree trunk and further supplemented with 190 mL of water, the IJs only application only promoted soil microbials for 2 weeks. The Chlorpyrifos effects did not last more than about 2 weeks either. This data is shown in FIG. 4A to FIG. 4C and in FIG. 5, and show that pheromone extracts extended the promotion of soil microbials to about 4 weeks.

Dry powder nematode pheromone extracts can be resus-pended in water and then applied with irrigation water with or without fertilizer or pesticides at planting, after planting, during growth season every 4 weeks, and/or 1 week before the drought or other abiotic stress conditions. For orchards, extracts can be applied 1 to 3 weeks before planting orchards in place of soil fumigants and after planting extracts may be applied monthly. Extracts can also be applied to seeds as seed treatment or as pellets during planting to improve plant stress tolerance to spring freezes or unexpected drought conditions or before expected pest pressures. Extracts are applied to a field with commercially available apparatus.

Non-limiting examples of nematodes that can be used to produce pheromone extracts from nematode growth medium using insects or liquid medium in shaker flasks, fermentors, or bioreactors which the present disclosure is applicable include the following:

Commercially available nematodes: Insect nematodes, entomopathogenic nematodes, in the genera *Heterorhabditis* and *Steinernema* species such as *Steinernema carpocapsae, Steinernema feltiae, Steinernema kraussei, Steinernema gla-seri, Steinernema scapterisci, Steinernema riobrave, Stein-ernema kushidai, Steinernema scarabaei* or *Heterorhabditis bacteriophora, Heterorhabditis megidis, Heterorhabditis indica, Heterorhabditis zealandica, Heterorhabditis downesi, Heterorhabditis marelata*. Table 3 below discloses some of the commercially available EPN species, and the recommended major pests targeted.

Commercial use of entomopathogenic nematodes (EPN) *Steinernema* and *Heterorhabditis* as bioinsecticides.

TABLE 3

| COMMERCIALLY-AVAILABLE NEMATODE EXAMPLES | |
| --- | --- |
| EPN species | Major pest(s) targeted - as recommended by various commercial companies |
| *Steinernema glaseri* | White grubs (scarabs, especially Japanese beetle, *Popillia* sp.), banana root borers |
| *Steinernema kraussei* | Black vine weevil, *Otiorhynchus sulcatus* |
| *Steinernema carpocapsae* | Turfgrass pests- billbugs, cutworms, armyworms, sod webworms, chinch bugs, crane flies. Orchard, ornamental and vegetable pests - banana moths, codling moths, cranberry girdlers, dogwood borers and other clearwing borer species, black vine weevils, peachtree borers, shore flies (*Scatella* spp.) |
| *Steinernema feltiae* | Fungus gnats (*Bradysia* spp.), shore flies, western flower thrips, leafminers |
| *Steinernema scapterisci* | Mole crickets (*Scapteriscus* spp.) |
| *Steinernema riobrave* | Citrus root weevils (*Diaprepes* spp.), mole crickets |
| *Heterorhabditis bacteriophora* | White grubs (scarabs), cutworms, black vine weevils, flea beetles, corn root worms, citrus root weevils |
| *Heterorhabditis megidis* | Weevils |
| *Heterorhabditis indica* | Fungus gnats, root mealybugs, grubs |
| *Heterorhabditis marelata* | White grubs (scarabs), cutworms, black vine weevils |
| *Heterorhabditis zealandica* | Scarab grubs |

See: entnemdept.ufl.edu/creatures/nematode/entomopathogenic_nematode.htm

To determine whether this effect was due to common compounds found in the nematode growth medium extract including pheromone, pheromone extracts from both *S. feltiae* (SN) and *S. carpocapsae* (All) consumed insect host cadavers from 0.0625×HCE (about 16× diluted) concentra-tions were tested.

Table 4 below lists some plant pests, efficacious nematode species, and the affected crop. Nematode species used are abbreviated as follows: Hb=*Heterorhabditis bacteriophora*, Hd=*H. downesi*, Hi=*H. indica*, Hm=*H. marelata*, Hmeg=*H. megidis*, Hz=*H. zealandica*, Sc=*Steinernema carpocapsae*, Sf=*S. feltiae*, Sg=*S. glaseri*, Sk=*S. kushidai*, Sr=*S. riobrave*, Sscap=*S. scapterisci*, Ss=*S. scarabaei*.

TABLE 4

PLANT PEST/EFFICACIOUS NEMATODES

| Pest Common Name | Pest Scientific name | Key targeted Crop | Efficacious Nematodes * |
|---|---|---|---|
| Artichoke plume moth | *Platyptilia carduidactyla* | Artichoke | Sc |
| Armyworms | Lepidoptera: Noctuidae | Vegetables | Sc, Sf, Sr |
| Banana moth | *Opogona sachari* | Ornamentals | Hb, Sc |
| Banana root borer | *Cosmopolites sordidus* | Banana | Sc, Sf, Sg |
| Billbug | *Sphenophorus* spp. (Coleoptera: Curculionidae) | Turf | Hb, Sc |
| Black cutworm | *Agrotis ipsilon* | Turf, vegetables | Sc |
| Black vine weevil | *Otiorhynchus sulcatus* | Berries, ornamentals | Hb, Hd, Hm, Hmeg, Sc, Sg |
| Borers | *Synanthedon* spp. and other sesiids | Fruit trees & ornamentals | Hb, Sc, Sf |
| Cat flea | *Ctenocephalides felis* | Home yard, turf | Sc |
| Citrus root weevil | *Pachnaeus* spp. (Coleoptera: Curculionidae | Citrus, ornamentals | Sr, Hb |
| Codling moth | *Cydia pomonella* | Pome fruit | Sc, Sf |
| Corn earworm | *Helicoverpa zea* | Vegetables | Sc, Sf, Sr |
| Corn rootworm | *Diabrotica* spp. | Vegetables | Hb, Sc |
| Cranberry girdler | *Chrysoteuchia topiaria* | Cranberries | Sc |
| Crane fly | Diptera: Tipulidae | Turf | Sc |
| Diaprepes root weevil | *Diaprepes abbreviatus* | Citrus, ornamentals | Hb, Sr |
| Fungus gnats | Diptera: Sciaridae | Mushrooms, greenhouse | Sf, Hb |
| Grape root borer | *Vitacea polistiformis* | Grapes | Hz, Hb |
| Iris borer | *Macronoctua onusta* | Iris | Hb, Sc |
| Large pine weevil | *Hylobius albietis* | Forest plantings | Hd, Sc |
| Leafminers | *Liriomyza* spp. (Diptera: Agromyzidae) | Vegetables, ornamentals | Sc, Sf |
| Mole crickets | *Scapteriscus* spp. | Turf | Sc, Sr, Scap |
| Navel orangeworm | *Amyelois transitella* | Nut and fruit trees | Sc |
| Plum curculio | *Conotrachelus nenuphar* | Fruit trees | Sr |
| Scarab grubs** | Coleoptera: Scarabaeidae | Turf, ornamentals | Hb, Sc, Sg, Ss, Hz |
| Shore flies | *Scatella* spp. | Ornamentals | Sc, Sf |
| Strawberry root weevil | *Otiorhynchus ovatus* | Berries | Hm |
| Small hive beetle | *Aethina tumida* | Beehives | Yes (Hi, Sr) |
| Sweetpotato weevil | *Cylas formicarius* | Sweet potato | Hb, Sc, Sf |

See: www.biocontrol.entomology.cornell.edu/pathogens/nematodes.php

Insects that are infected by insect nematodes/entomopathogenic nematodes and can be used a growth medium for nematodes include, but are not limited to: Artichoke plume moth, Armyworms, Banana moth, Banana root borer, Billbug, Black cutworm, Black vine weevil, Borers, Cat flea, Chinch bugs, Citrus root weevil, Codling moth, Corn earworm, Corn rootworm, Cranberry girdler, Crane fly, Diaprepes root weevil, Fungus gnats, Grape root borer, Iris borer, Large pine weevil, Leafminers, Mole crickets, Navel orangeworm, Plum curculio, Scarab grubs, Shore flies, Strawberry root weevil, Small hive beetle, Sod webworms Sweetpotato weevil.

Noncommercial nematodes that produce ascr #9 and/or ascr #11 and their growth medium can be used to produce those pheromones: *Panagrellus redivivus* and other *Panagrellus* spp., *Oscheius tipulae, O. carolinencis* and *Oscheius* spp., *Caenorhabditis elegans, Caenorhabditis* sp.7, *Caenorhabditis* spp., *Rhabditis* spp., *Pristionchus pacificus* and *Pristionchus* spp., plant parasitic nematodes such as the pinewood nematode, *Bursaphelenchus xylophilus. B. mucronatus, Bursaphelenchus* spp.

Plant parasitic nematode (*Bursaphelenchus* spp) vector insects *Monochamus alternatus* insects were shown to produce ascarosides like ascr #1, ascr #2, ascr #3, ascr #9 icas #9 (Zhao et al 2016). Plant parasitic nematode vector insects can also be reared to produced and extract ascaroside pheromones.

The commercial soil microbials together with nematode pheromone extracts can be applied to the soil to promote specific microbials. In the field, about 16× dilution *S. carpocapsae* or *S. feltiae* pheromone extracts (34 HCE) with recommended dose of commercial soil microbials in 110 mL of water in a 15 cm area surrounding from the tree trunk and further supplemented with 190 mL of water. After that, pheromone extracts are applied every 4 weeks with or without the commercial microbials. Alternatively, commercial microbials can be resuspended in 110 mL or 300 mL of water containing pheromone extracts containing 34 HCE (about 115 mg of extracts) and placed in the soil surrounding the 15 cm from the tree trunk.

Commercially available soil microbials, their mode of action, and how they can improve plant growth and tolerance to environmental stresses are known in the art.

Non-limiting fungal microbials, their description and mode of action are the following:

*Aspergillus niger*: It is an egg parasite and induces systemic resistance against plant-parasitic nematodes. The fungus coming in contact with a cyst, or an egg mass begins to grow rapidly. It colonizes the eggs where larval formation has not been completed, thus providing early protection to the growing plants against nematodes.

*Paecilomyces lilacinus*: It is mainly an egg parasite. The fungus produces antibiotics viz., leucinostatin and lilacin and enzymes such as protease and chitinase. Protease has nematicidal activity, causes degradation of the eggshell, and inhibits hatching. Chitinase breaks down the eggshell making the route for the fungus to pass through. The decomposition of chitin releases ammonia, which is toxic to second-stage juveniles of root-knot nematode (RKN). Its hypha enters the vulva and anus of RKN females. The fungus penetrates the egg and develops profusely inside and over the eggs, completely inhibiting juvenile development. The infected eggs swell and buckle. As penetration continues, the vitelline layer of the egg splits into three bands and a large number of vacuoles; lipid layer disappears at this stage. The developing juvenile inside the egg is destroyed by the rapidly growing hyphae. Many conidiophores are produced, and the hypha moves to the adjacent eggs.

*Trichoderma harzianum*: Secretes many lytic enzymes like chitinase, glucanases, and proteases which help parasitism of *Meloidogyne* and *Globodera* eggs. The chitin layer is dissolved through enzymatic activity. The hyphae of *T. harzianum* penetrate the eggs and juvenile cuticle, proliferate within the organism, and produce toxic metabolites.

*T. viride*: Produce antibiotics like trichodermin, dermadin, trichoviridin, and sesquiterpene heptalic acid which are involved in the suppression of nematodes.

*Pochonia chlamydosporia*: Parasitizes the eggs and adult females of plant-parasitic nematodes. The root-knot and cyst nematodes are the primary hosts of this fungus, but it is also known to parasitize citrus, burrowing, and reniform nematodes. The fungus enters the nematode cysts either through natural openings or it may directly penetrate the wall of the cyst. It forms a branched mycelia network when in close contact with the smooth eggshell. The fungus produces an appressorium that adheres to the eggshell by mucigens and from which an infection peg develops and penetrates the eggshell. Penetration also occurs from lateral branches of the mycelium. This results in disintegration of the eggshell's vitelline layer and also partial dissolution of the chitin and lipid layers, possibly due to the activity of exoenzymes. Egg hatching is inhibited due to toxins secreted by the fungus.

Non-limiting description of the bacterial soil microbials that either parasitize or produce toxins to suppress plant parasitic nematodes:

*Pasteuria penetrans*: Bacterial spores are attached to the nematode's body and germinate forming a germ tube that penetrates the body cuticle. Vegetative mycelial colonies eventually fill the body with a large number of endospores.

*Pseudomonas fluorescens*: Produce antibiotics viz., phenazines, tropolone, pyrrolnitrin, pyocyanin, and 2,4-diacetylphloroglucinol which have suppressive effect on plant-parasitic nematodes.

*Bacillus firmus*: Enzymatic action, degradation of root exudates, root-protection, and the production of a phytohormone.

*B. thuringiensis*: Nematicidal toxins found in families of *B. thuringiensis* proteins.

*B. subtilis*: The genes are encoding surfactin and iturin synthesis as antibiotics.

Non-limiting description of soil microbials that produce phytohormone and induce plant tolerance to abiotic and biotic stresses:

TABLE 5

| Microorganisms | Phytohormone | Host plant | Abiotic stress |
|---|---|---|---|
| *Pseudomonas* sp. | IAA | *Sulla carnosa* (Desf.) | Salt stress |
| *Bacillus* sp. | IAA | *Sulla carnosa* (Desf.) | Salt stress |
| *Bacillus licheniformis* | IAA | *Triticum aestivum* L. | Salt stress |
| *Bacillus Subtilis* | IAA | *Triticum aestivum* L. | Salt stress |
| *Arthrobacter* sp. | IAA | *Triticum aestivum* L. | Salt stress |
| *Pseudomonas putida* | IAA | *Trifolium repens* | Drought stress |
| *Bacillus megaterium* | IAA | *Trifolium repens* | Drought stress |
| *Marinobacterium* sp. | IAA | *Triticum aestivum* L. | Salt stress |
| *Pseudomonas* sp. | IAA | *Triticum aestivum* L. | Salt stress |
| *Rhizobium* sp. | IAA | *Triticum aestivum* L. | Salt stress |
| *Sinorhizobium* sp. | IAA | *Triticum aestivum* L. | Salt stress |
| *Serratia plymuthica* | IAA | *Cucumis sativus* | Salt stress |
| *Stenotrophomonas rhizophila* | IAA | *Cucumis sativus* | Salt stress |
| *Pseudomonas fluorescens* | IAA | *Cucumis sativus* | Salt stress |
| *Pseudomonas extremorientalis* | IAA | *Cucumis sativus* | Salt stress |
| *Acinetobacter faecalis* | IAA | *Triticum aestivum* L. | Salt stress |
| *Bacillus cereus* | IAA | *Triticum aestivum* L. | Salt stress |
| *Enterobacter hormaechei* | IAA | *Triticum aestivum* L. | Salt stress |
| *Pantoea agglomerans* | IAA | *Triticum aestivum* L. | Salt stress |
| *Curtobacterium flaccumfaciens* | IAA | *Hordeum vulgare* | Salt stress |
| *Ensifer garamanticus* | IAA | *Hordeum vulgare* | Salt stress |
| *Streptomyces coelicolor* | IAA | *Triticum aestivum* L. | Salt stress |
| *Streptomyces geysiriensis* | IAA | *Triticum aestivum* L. | Salt stress |
| *Bacillus Subtilis* | IAA | *Acacia gerrardii* Benth. | Salt stress |
| *Pseudomonas* sp. | IAA | *Zea mays* | Salt stress |
| *Pseudomonas* sp. | IAA | *Zea mays* | Heat stress |
| *Serratia* sp. | IAA | *Cicer arietinum* L. | Nutrient stress |
| *Achromobacter xylosoxidans* | IAA | *Brassica juncea* | Cu stress |
| *Pseudomonas putida* | IAA | *Glycine max* (L.) Merr. | Salt stress |
| *Leifsonia* sp. | IAA | *Zea mays* | Cd stress |
| *Bacillus* sp. | IAA | *Zea mays* | Cd stress |
| *Burkholderia* sp. | IAA | *Solanum lycopersicum* L. | Cd stress |
| *Bacillus Subtilis* | IAA | *Brassica juncea* L. | Ni stress |
| *Bacillus megaterium* | IAA | *Vinca rosea* L. | Ni stress |
| *Achromobacter xylosoxidans* | SA | *Helianthus annuus* | Drought stress and biotic stress |

TABLE 5-continued

| Microorganisms | Phytohormone | Host plant | Abiotic stress |
|---|---|---|---|
| *Bacillus pumilus* | SA | *Helianthus annuus* | Drought stress and biotic stress |
| *Serratia marcescens* | SA | *Zea mays* | Salt stress and biotic stress |
| *Micrococcus luteus* | CK | *Zea mays* | Drought stress |
| *Arthrobacter* sp. | CK | *Glycine max* (L.) Merr. | Salt stress |
| *Bacillus* sp. | CK | *Glycine max* (L.) Merr. | Salt stress |
| *Azospirillum* sp. | CK | *Glycine max* (L.) Merr. | Salt stress |
| *Bacillus Subtilis* | CK | *Platycladus orientalis* | Drought stress |
| *Aspergillus fumigatus* | GA | *Glycine max* (L.) Merr. | Salt stress |
| *Azospirillum lipoferum* | GA | *Triticum aestivum* L. | Drought stress |
| *Phoma glomerata* | GA | *Cucumis sativus* | Drought stress |
| *Penicillium* sp. | GA | *Cucumis sativus* | Drought stress |
| *Bacillus amyloliquefaciens* | ABA | *Oryza sativa* L. | Salt stress |
| *Bacillus licheniformis* | ABA | *Vitis vinifera* L. | Water stress |
| *Pseudomonas fluorescens* | ABA | *Vitis vinifera* L. | Water stress |
| *Trichoderma asperellum* | IAA | *Cucumis sativus* | Salt stress |
| *Trichoderma asperellum* | GA | *Cucumis sativus* | Salt stress |
| *Trichoderma asperellum* | ABA | *Cucumis sativus* | Salt stress |
| *Bacillus aryabhattai* | IAA | *Glycine max* (L.) Merr. | Heat stress |
| *Bacillus aryabhattai* | GA | *Glycine max* (L.) Merr. | Heat stress |
| *Bacillus aryabhattai* | ABA | *Glycine max* (L.) Merr. | Heat stress |

IAA: Indole acetic acid,
SA: salicylic acid,
CK: cytokinin,
GA: gibberellic acid,
ABA: abscisic acid Non-limiting description of soil microbials which suppress plant bacterial and fungal diseases are listed in Table 6 below.

TABLE 6

| Bacteria Biocontrol Agent | Disease Inhibited | Pathogen Attacked | Crop Host |
|---|---|---|---|
| *Bacillus* | Crown gall disease | *Agrobacterium tumefaciens* | Peach |
| *Bacillus amyloliquefaciens* | Brown rot | *Monilinia* sp. | Apple |
| *Bacillus amyloliquefaciens* | Blue mold | *Penicillium expansum* | Apple |
| *Bacillus amyloliquefaciens* LE109 | Citrus canker | *Xanthomonas citri* | Lime |
| Bacteria Biocontrol Agent | Disease Inhibited | Pathogen Attacked | Crop Host |
| *Bacillus amyloliquefaciens* NCPSJ7 | Gray mold | *Botrytis cinerea* | Grapes |
| *Bacillus amyloliquefaciens* RS-25 | Grey mold | *Botrytis cinerea* | Tomato, strawberry, and grapefruit |
| *Bacillus anthracis* Ba66 | Bacterial canker | *Pseudomonas syringae* pv. *Syringae* | Wild pistachio tree |
| *Bacillus anthracis* Ba66 | Brown blotch | *Pseudomonas tolaasii* | Wild pistachio tree |
| *Bacillus licheniformis* MG-4 | Grey mold | *Botrytis cinerea* | Tomato, strawberry, and grapefruit |
| *Bacillus megaterium* | Damping-off | *Aspergillus flavus* | Peanut |
| *Bacillus pumilus* GLB197 | Downy mildew disease | *Plasmopara viticola* | Grapevine |
| *Bacillus* sp. | Gray mold | *Botrytis cinerea* | Grape |
| *Bacillus* sp. | Bacterial wilt | *Ralstonia solanacearum* | Banana |
| *Bacillus* sp. | White mould | *Sclerotinia sclerotiorum* | Soybean |
| *Bacillus* sp. | Phomopsis seed decay | *Phomopsis sojae* | Soybean |
| *Bacillus* sp. | Root rot | *Rhizoctonia solani* | Soybean |
| *Bacillus* sp. LYLB3 | Pear ring rot disease | *Botryosphaeria dothidea* | Pear |
| *Bacillus* sp. LYLB4 | Rhizopus soft rot | *Rhizopus stolonifer* | Pear |
| *Bacillus Subtilis* | Anthracnose | *Colletotrichum musae* | Banana |
| *Bacillus Subtilis* | Rot | *Alternaria alternata* | Melon |
| *Bacillus Subtilis* | Anthracnose | *Colletotrichum* sp. | Pepper |
| Bacillus Subtilis 10-4 | Late blight | *Phytophthora infestans* | Potato |
| *Bacillus Subtilis* 10-4 | Fusarium wilt | *Fusarium oxysporum* | Potato |
| *Bacillus Subtilis* 10-4 | Dry rot | *Fusarium oxysporum* | Potato |
| *Bacillus Subtilis* 26D | Late blight | *Phytophthora infestans* | Potato |

16

TABLE 6-continued

| Bacteria Biocontrol Agent | Disease Inhibited | Pathogen Attacked | Crop Host |
|---|---|---|---|
| *Bacillus Subtilis* 26D | Fusarium wilt | *Fusarium oxysporum* | Potato |
| *Bacillus Subtilis* 26D | Dry rot | *Fusarium oxysporum* | Potato |
| *Bacillus Subtilis* 7PJ-16 | Mulberry sclerotiniose | *Scleromitrula shiraiana* | Mulberry fruit |
| *Bacillus Subtilis* 7PJ-17 | Mulberry sclerotiniose | *Scleromitrula sclerotiorum* | Mulberry fruit |
| *Bacillus Subtilis* 7PJ-18 | Mulberry sclerotiniose | *Botryotinia fuckeliana* | Mulberry fruit |
| *Bacillus Subtilis* 7PJ-19 | Mulberry sclerotiniose | *Cercospora beticola* | Mulberry fruit |
| *Bacillus Subtilis* 7PJ-20 | Mulberry sclerotiniose | *Fusarium oxysporum* | Mulberry fruit |
| *Bacillus Subtilis* GLB191 | Downy mildew disease | *Plasmopara viticola* | Grapevine |
| *Bacillus Subtilis* LE24 | Citrus canker | *Xanthomonas citri* | Lime |
| *Bacillus Subtilis* Pnf-4 | Grey mold | *Botrytis cinerea* | Tomato, strawberry, and grapefruit |
| *Bacillus tequilensis* PO80 | Citrus canker | *Xanthomonas citri* | Lime |
| *Bacillus velezensis* | Anthracnose | *Colletotrichum musae* | Banana |
| *Bacillus velezensis* strain BUZ-I4 | Grey mold | *Botrytis cinerea* | Grape, apricot, mandarin, apple |
| *Bacillus velezensis* strain BUZ-I4 | Brown rot | *Monilinia fructicola* | Grape, apricot, mandarin, apple |
| *Bacillus velezensis* strain BUZ-I4 | Brown rot | *Monilinia laxa* | Grape, apricot, mandarin, apple |
| *Bacillus velezensis* strain BUZ-I4 | Blue rot | *Penicillium italicum* | Grape, apricot, mandarin, apple |
| *Bacillus velezensis* strain BUZ-I4 | Green rot | *Penicillium digitatum* | Grape, apricot, mandarin, apple |
| *Bacillus velezensis* strain BUZ-I4 | Blue mold | *Penicillium expansum* | Grape, apricot, mandarin, apple |
| *Bacillus velezensis* strain I3 | Grey mold | *Botrytis cinerea* | Grape, apricot, mandarin, apple |
| *Bacillus velezensis* strain I3 | Brown rot | *Monilinia fructicola* | Grape, apricot, mandarin, apple |
| *Bacillus velezensis* strain I3 | Brown rot | *Monilinia laxa* | Grape, apricot, mandarin, apple |
| *Bacillus velezensis* strain I3 | Blue rot | *Penicillium italicum* | Grape, apricot, mandarin, apple |
| *Bacillus velezensis* strain I3 | Green rot | *Penicillium digitatum* | Grape, apricot, mandarin, apple |
| *Bacillus velezensis* strain I3 | Blue mold | *Penicillium expansum* | Grape, apricot, mandarin, apple |
| *Bacillus velezensis* strain I5 | Grey mold | *Botrytis cinerea* | Grape, apricot, mandarin, apple |
| *Bacillus velezensis* strain I5 | Brown rot | *Monilinia fructicola* | Grape, apricot, mandarin, apple |
| *Bacillus velezensis* strain I5 | Brown rot | *Monilinia laxa* | Grape, apricot, mandarin, apple |
| *Bacillus velezensis* strain I5 | Blue rot | *Penicillium italicum* | Grape, apricot, mandarin, apple |
| *Bacillus velezensis* strain I5 | Green rot | *Penicillium digitatum* | Grape, apricot, mandarin, apple |
| *Bacillus velezensis* strain I5 | Blue mold | *Penicillium expansum* | Grape, apricot, mandarin, apple |
| *Burkholderia cepacia* | Anthracnose | *Colletotrichum gloeosporioides* | Mango |
| *Burkholderia* sp. | White mould | *Sclerotinia sclerotiorum* | Soybean |
| *Burkholderia* sp. | Phomopsis seed decay | *Phomopsis sojae* | Soybean |
| *Burkholderia* sp. | Root rot | *Rhizoctonia solani* | Soybean |
| *Burkholderia stabilis* PG159 | Blight | *Alternaria panax* | Ginseng |
| *Burkholderia stabilis* PG160 | Grey mold | *Botrytis cinerea* | Ginseng |
| *Burkholderia stabilis* PG161 | Root rot | *Cylindrocarpon destructans* | Ginseng |
| *Burkholderia stabilis* PG162 | Root rot | *Phytophthora cactorum* | Ginseng |
| *Burkholderia stabilis* PG163 | Damping-off | *Pythium* sp. | Ginseng |
| *Burkholderia stabilis* PG164 | Damping-off | *Rhizoctonia solani* | Ginseng |

TABLE 6-continued

| Bacteria Biocontrol Agent | Disease Inhibited | Pathogen Attacked | Crop Host |
|---|---|---|---|
| *Burkholderia stabilis* PG165 | Root rot | *Rhizoctonia solani* | Ginseng |
| *Citrobacter freundii* | Anthracnose | *Colletotrichum musae* | Banana |
| *Enterobacter asburiae_01* | Anthracnose | *Colletotrichum musae* | Banana |
| *Enterobacter asburiae_02* | Anthracnose | *Colletotrichum musae* | Banana |
| *Enterobacter cloacae* | Anthracnose | *Colletotrichum musae* | Banana |
| *Enterobacter kobei* | Anthracnose | *Colletotrichum musae* | Banana |
| *Enterobacter xiangfangensis* | Anthracnose | *Colletotrichum musae* | Banana |
| *Lactobacillus plantarum* CM-3 | Grey mold | *Botrytis cinerea* | Strawberry |
| *Paenibacillus polymyxa* | Anthracnose | *Colletotrichum gloeosporioides* | Apple |
| *Pantoea* | Crown gall disease | *Agrobacterium tumefaciens* | Peach |
| *Pantoea agglomerans* | Anthracnose | *Colletotrichum musae* | Banana |
| *Pantoea Brenneri* Pb1 | Bacterial canker | *Pseudomonas syringae* pv. *Syringae* | Wild pistachio tree |
| *Pantoea Brenneri* Pb1 | Brown blotch | *Pseudomonas tolaasii* | Wild pistachio tree |
| *Pantoea dispersa* | Anthracnose | *Colletotrichum musae* | Banana |
| *Pantoea dispersa* | Black rot | *Ceratocytis fimbriata* | Sweet potato |
| *Pseudomonas* | Crown gall disease | *Agrobacterium tumefaciens* | Peach |
| *Pseudomonas aeruginosa* | Damping-off | *Rhizoctonia solani* | Pepper |
| *Pseudomonas fluorescens* | Blue mold | *Penicillium expansum* | Apple |
| *Pseudomonas fluorescens* | Anthracnose | *Colletotrichum gloeosporioides* | Avocado |
| *Pseudomonas fluorescens* P142 | Bacterial wilt | *Ralstonia solanacearum* (biovar 2, race 3) | Tomato |
| *Pseudomonas protegens* Pb24 | Bacterial canker | *Pseudomonas syringae* pv. *Syringae* | Wild pistachio tree |
| *Pseudomonas protegens* Pb24 | Brown blotch | *Pseudomonas tolaasii* | Wild pistachio tree |
| *Pseudomonas protegens* Pb3 | Bacterial canker | *Pseudomonas syringae* pv. *Syringae* | Wild pistachio tree |
| *Pseudomonas protegens* Pb3 | Brown blotch | *Pseudomonas tolaasii* | Wild pistachio tree |
| *Pseudomonas protegens* Pb71 | Bacterial canker | *Pseudomonas syringae* pv. *Syringae* | Wild pistachio tree |
| *Pseudomonas protegens* Pb71 | Brown blotch | *Pseudomonas tolaasii* | Wild pistachio tree |
| *Pseudomonas protegens* Pb78 | Bacterial canker | *Pseudomonas syringae* pv. *Syringae* | Wild pistachio tree |
| *Pseudomonas protegens* Pb78 | Brown blotch | *Pseudomonas tolaasii* | Wild pistachio tree |
| *Pseudomonas* sp. | Damping-off | *Pythium ultimum* | Cucumber |
| *Pseudomonas* sp. | Piriculariosis | *Pyricularia grisea* | Rice |
| *Pseudomonas* sp. R4R21AP | Bacterial canker | *Pseudomonas syringae* pv. *actinidiae* (Psa) | Kiwifruit |
| *Pseudomonas* sp. T1R12P | Bacterial canker | *Pseudomonas syringae* pv. *actinidiae* (Psa) | Kiwifruit |
| *Pseudomonas* sp. T1R21 | Bacterial canker | *Pseudomonas syringae* pv. *actinidiae* (Psa) | Kiwifruit |
| *Pseudomonas* sp. T4MS32AP | Bacterial canker | *Pseudomonas syringae* pv. *actinidiae* (Psa) | Kiwifruit |
| *Pseudomonas* sp. T4MS33 | Bacterial canker | *Pseudomonas syringae* pv. *actinidiae* (Psa) | Kiwifruit |
| *Pseudomonas synxantha* | Brown rot | *Monilinia fructicola* | Peach |
| *Pseudomonas synxantha* DLS65 | Postharvest brown rot | *Monilinia fructicola* & *Monilinia fructigena* | Stone fruit |
| *Pseudomonas syringae* | Green mold | *Penicillium digitatum* | Citrus |
| *Pseudomonas syringae* | Blue and green mold | *Pseudomonas digitatum* | Citrus |
| *Pseudomonas syringae* | Blue and green mold | *Pseudomonas italicum* | Citrus |
| *Rahnella aquatilis* | Molds | *Penicillium expansum* | Fruit |
| *Rhizobium* | Crown gall disease | *Agrobacterium tumefaciens* | Peach |
| *Serratia plymuthica* Sp15 | Bacterial canker | *Pseudomonas syringae* pv. *Syringae* | Wild pistachio tree |
| *Serratia plymuthica* Sp15 | Brown blotch | *Pseudomonas tolaasii* | Wild pistachio tree |
| *Stenotrophomonas maltophilia* | Anthracnose | *Colletotrichum musae* | Banana |

TABLE 6-continued

| Bacteria Biocontrol Agent | Disease Inhibited | Pathogen Attacked | Crop Host |
|---|---|---|---|
| *Stenotrophomonas maltophilia* Sm25 | Bacterial canker | *Pseudomonas syringae* pv. *Syringae* | Wild pistachio tree |
| *Stenotrophomonas maltophilia* Sm25 | Brown blotch | *Pseudomonas tolaasii* | Wild pistachio tree |
| *Stenotrophomonas maltophilia* Sm97 | Bacterial canker | *Pseudomonas syringae* pv. *Syringae* | Wild pistachio tree |
| *Stenotrophomonas maltophilia* Sm97 | Brown blotch | *Pseudomonas tolaasii* | Wild pistachio tree |
| *Stenotrophomonas rhizophila* | Anthracnose | *Colletotrichum gloeosporioides* | Mango |

For example, plants will convert ascr #18 to ascr #9, ascr #11 if they are fed/sprayed on aerial plant organs or irrigated on plant roots in the field or in hydroponic plant growth system.

In light of the foregoing disclosure, those skilled in the art will appreciate that this disclosure includes a method for obtaining pheromone extract compositions that induce plant tolerance against abiotic stress by an entomopathogenic nematode ("EPN") dispersal by obtaining a nutrient depleted entomopathogenic nematode ("EPN") growth medium selected from liquid broth, agar medium, and insect host cadaver, depleted of nutrients by growing said EPN to stasis in said growth medium. From the growth medium, (e.g. with insect host cadavers, alcohol is added to the cadavers because the volume is very small; with liquid broth, it can be first spray dried or frozen and then lyophilized because the initial volume is large, and then extracted with alcohol), producing an alcohol-growth medium mixture by adding an alcohol to the growth medium to achieve a final concentration of between about 0% to about 95% of the alcohol in the growth medium. The alcohol-growth medium mixture is centrifuged to remove solid or insoluble matter while maintaining a supernatant from the centrifugation step. Preferably, the supernatant from the centrifuging step is dried to produce a dry extract. The dry extract is then, preferably, resuspended in water or equivalent aqueous medium to produce a water-soluble pheromone extract. The water-soluble pheromone extract is preferably again centrifuged to remove water/aqueous medium insoluble compounds while maintaining a water-soluble supernatant. To preserve the activity, the supernatant from this centrifugation step is dried to produce a dry pheromone extract for plant fitness/tolerance to abiotic stress including drought/water deficit, cold, heat, light stress.

In some embodiments, the alcohol is ethanol, methanol, or mixtures thereof. In an embodiment, the growth medium is a growth medium in which non-pathogenic bacterivore nematodes or insect or entomopathogenic nematodes have been grown.

According to this disclosure, the pheromone extract composition is produced by a method as described herein. Furthermore, further partial purification, fractions of the composition are produced and combined in differing ratios to produce an active mixture of purified ascaroside pheromones individually or as a mixture.

In a further embodiment according to the disclosure, the composition is used to induce plant tolerance against abiotic stress including cold shock, drought/water deficit stress in field applications by applying the composition in an aqueous medium to drip irrigation water/other means of irrigation, or with pesticide or fertilizer application at planting, or post planting during growth season until harvest. Treatment of plants and soil with the composition described herein may be carried out directly or by allowing the compounds to act on the surroundings, environment, or storage space by the customary treatment methods, for example by immersion, spraying, evaporation, fogging, scattering, painting on and, in the case of propagation material, in particular in the case of seeds, also by applying one or more coats. The composition in an aqueous medium can be applied every 20-30-day intervals to the plant roots in the greenhouse or in the field.

Depending on the plant species or plant cultivars, their location and growth conditions (soils, climate, vegetation period, diet), the treatment according to the disclosure may also result in super-additive ("synergistic") effects. Thus, for example, reduced application rates and/or a widening of the activity spectrum and/or an increase in the activity of the substances and compositions to be used, better plant growth, increased tolerance to high or low temperatures, increased tolerance to drought or to water or soil salt content, increased flowering performance, easier harvesting, accelerated maturation, higher harvest yields, better quality and/or a higher nutritional value of the harvested products, better storage stability and/or processability of the harvested products that exceed the effects which were actually to be expected may occur.

The pheromone extracts or purified pheromones (ascarosides individually or as a mixture) described herein may be used in unchanged form or together with an agronomically acceptable carrier. The term "agronomically acceptable carrier" includes any carrier suitable for administration to a plant or soil, for example, customary excipients in formulation techniques, such as solutions (e.g., directly sprayable or dilutable solutions), emulsions, (e.g., emulsion concentrates and diluted emulsions), wettable powders, suspensions, soluble powders, powders, dusts, pastes, soluble powders, granules, suspension-emulsion concentrates, encapsulation into polymeric materials, coatable pastes, natural and synthetic materials impregnated with active compound and micro-encapsulations in polymeric substances. These formulations are produced in a known manner, for example by mixing the compounds with agronomically acceptable carrier, such as liquid solvents or solid carriers, optionally with the use of surfactants, including emulsifiers, dispersants, and/foam-formers.

If the agronomically acceptable carrier is water organic solvents can also be employed, for example, as auxiliary solvents. Suitable liquid solvents include, for example, aromatics (e.g., xylene, toluene and alkylnaphthalenes); chlorinated aromatics or chlorinated aliphatic hydrocarbons (e.g., chlorobenzenes, chloroethylenes and methylene chloride); aliphatic hydrocarbons (e.g., cyclohexane); paraffins (e.g., petroleum fractions, mineral and vegetable oils); alcohols (e.g., butanol or glycol and also their ethers and esters); ketones (e.g., acetone, methyl ethyl ketone, methyl isobutyl ketone and cyclohexanone) and strongly polar solvents (e.g., dimethylformamide and dimethyl sulphoxide). Nontoxic carriers are used in the methods of the present disclosure.

Other solid agronomically acceptable carriers include, for example, ammonium salts and ground natural minerals (e.g., kaolins, clays, talc, chalk, quartz, attapulgite, montmorillonite and diatomaceous earth); ground synthetic minerals (e.g., highly disperse silica, alumina and silicates); crushed and fractionated natural rocks (e.g., calcite, marble, pumice, sepiolite and dolomite); synthetic granules of inorganic and organic meals; granules of organic material (e.g., sawdust, coconut shells, maize cobs and tobacco stalks).

Some emulsifiers and foam-formers that can be used include, for example, nonionic and anionic emulsifiers (e.g., polyoxyethylene fatty acid esters, polyoxyethylene fatty alcohol ethers, for example, alkylaryl polyglycol ethers, alkylsulphonates, alkyl sulphates and arylsulphonates) protein hydrolysates. Suitable dispersants include, for example, lignin-sulphite waste liquors and methylcellulose.

Tackifiers such as carboxymethylcellulose and natural and synthetic polymers in the form of powders, granules or latices, such as gum arabic, polyvinyl alcohol and polyvinyl acetate, as well as natural phospholipids, such as cephalins and lecithins, and synthetic phospholipids, can be used in the formulations. Other additives may include, for example, mineral and vegetable oils.

Colorants such as inorganic pigments, for example, iron oxide, titanium oxide and Prussian Blue, and organic dyestuffs, such as alizarin dyestuffs, azo dyestuffs and metal phthalocyanine dyestuffs, and trace nutrients such as salts of iron, manganese, boron, copper, cobalt, molybdenum and zinc may also be included in the agronomically acceptable carrier.

The soil microbial-promoting compositions can be administered to the plant, soil, and/or plant environments surrounding the plants by any techniques known in the art, including, for example, spraying, atomizing, dusting, scattering, coating, or pouring. One of skill in the art would be able to determine the appropriate technique for administration without undue experimentation according to the specific abiotic stress to be combated, the specific chemical composition and formulation of the compound being employed, the method of applying the compound/formulation, and the locus of treatment.

In an embodiment, the promoters of soil microbials can be administered by foliar application. In another embodiment, the compositions can also reach the plants through the root system via the soil by drenching the locus of the plant with a liquid preparation or by incorporating the substances into the soil in solid form, e.g., in the form of granules (soil application). In rice cultivations, these granules can be dispensed over the flooded paddy field. The compositions of the present disclosure may also be applied to tubers or seed grain, for example, by soaking, spraying, or drenching the seed grain or tubers in a liquid nematode pheromone or ascaroside containing composition or by coating the tubers or seed grain with a solid nematode pheromone (ascaroside) composition or with other biocontrol agents or beneficial soil microbials.

Pheromone extraction methods and compositions to improve soil microbials that induce plant tolerance to abiotic and biotic stresses are disclosed herein, including enhanced resistance to low temperature/cold stress, freezing stress, high temperature/heat stress, salt/salinity stress, low (shading stress) or excessive light (ultraviolet (UV) radiation and other cosmic radiation), oxidative stress, heavy metal stress, lack of oxygen conditions, flooding, drought/water deficit, viral, fungal and bacterial pathogens and/or combinations thereof.

Pheromone extraction methods and compositions to improve soil microbials that protect plants directly by parasitizing the pests and pathogens like infecting insects, fungus or suppressing plant pathogens and diseases by producing antibiotics or antimicrobials and/or combinations thereof.

In light of the foregoing disclosure, and to ensure ipssisimus verbis written description and enabling support is provided here for what is claimed herein below, those skilled in the art will appreciate that the present disclosure includes at least the following embodiments, component interchangeable elements, and equivalents thereof:

A method for increasing abundance of soil microbials that improve plant growth and health and protect plants from pest and pathogens and that also induce plant abiotic and biotic resistance traits in plants which includes (a) combining at least one nematode ascaroside with a carrier to form an ascaroside composition; (b) applying the ascaroside composition to the soil to increase existing soil microbials in an amount and for a period sufficient to cause at least one soil microbial to parasitize a plant pest or pathogen or suppress a plant pathogen by producing antibiotics; (c) applying the ascaroside composition to the soil to increase existing soil microbials in an amount and for a period sufficient to cause at least one soil microbial producing plant hormones to the target plant to exhibit at least one elevated abiotic or biotic stress characteristic; (d) applying the ascaroside composition with a commercial microbial to promote its abundance in the soil up to 4 weeks to parasitize the target plant pest and pathogen or suppress the pest and pathogen by producing antimicrobials; (d) applying the ascaroside composition with a commercial microbial to promote its abundance up to about 4 weeks in the soil around the plant to the target plant to exhibit at least one elevated abiotic or biotic stress characteristic as compared to a control plant not so treated.

From this disclosure, various specific embodiments arise, including wherein the ascaroside composition is produced by the following method: Obtaining a nutrient depleted nematode growth medium selected from liquid broth, agar medium, and insect host cadaver, depleted of nutrients by growing said nematodes to stasis in said growth medium; Producing an alcohol-growth medium mixture by adding an alcohol to said growth medium to achieve a final concentration of between about 0% to about 95% of said alcohol in said growth medium; Centrifuging said alcohol-growth medium mixture to remove solid or insoluble matter while maintaining a supernatant from said centrifuging; and Drying the supernatant from said centrifuging to produce a dry extract. This extract may be further refined by: Resuspending said dry extract in an aqueous medium to produce a water-soluble pheromone extract; Centrifuging said water-soluble pheromone extract to remove water-insoluble compounds while maintaining a water-soluble supernatant; and Freeze drying or spray drying said water-soluble supernatant to produce a dry plant abiotic stress-tolerance inducing composition. The alcohol used is ethanol, methanol, or mixtures thereof. The growth medium is a growth medium in which non-pathogenic bacterivore nematodes or insect or entomopathogenic nematodes have been grown. The ascaroside composition is fractionated and differing ratios of fractions are combined to achieve a purified plant abiotic stress resistance inducing composition.

The ascaroside composition can be applied by coating plant seeds, or germinating seedling roots, before they are planted, or by drenching the roots of existing plants, in situ or in the course of transfer, or by introducing the composition onto the bases of target plants. The application of the ascaroside composition to target plants promotes the beneficial soil microbiome around the roots to improve plant growth and health and protect plants from pests and pathogens as well as induces resistance to damage following stress, an increase in resistance to cold stress, an increase in drought tolerance, and/or combinations thereof. Application of the ascaroside composition to target plants soil microbiome abundance that promotes plant growth, health and protects plants from abiotic and biotic stress and induces plant tolerance to abiotic and biotic stresses including tolerance to low temperature/cold stress, freezing stress, high temperature/heat stress, salt/salinity stress, low (shading stress) or excessive light (ultraviolet (UV) radiation and other cosmic radiation), microgravity stress, which causes flooding response in plants, oxidative stress, heavy metal stress, lack of oxygen conditions, flooding, drought/water deficit, and/or combinations thereof.

In some embodiments, the composition according to this disclosure is used and effective at about 16 to about 44 times less than physiologically relevant pheromone extract concentrations for nematodes, to promotes soil microbials.

Contacting a plant or plant part with a composition of the disclosure can result in localized plant beneficial microbials in the root, stem, leaf, seed, flower, and/or combinations thereof. The plant may be a dicot, a monocot, an annual, a perennial, a crop plant, alfalfa, rice, wheat, barley, rye, cotton, sunflower, peanut, corn, oat, millet, flax, potato, sweet potato, bean, green bean, wax bean, lima bean, pea, chicory, lettuce, endive, cabbage, brussel sprout, beet, sugar beet, parsnip, turnip, cauliflower, broccoli, turnip, radish, spinach, onion, garlic, eggplant, pepper, celery, carrot, squash, pumpkin, zucchini, cucumber, melon, yam, carrots, cassava, citrus, strawberry, grape, raspberry, pineapple, soybean, tobacco, tomato, sorghum, sugarcane, ornamental plant, *Arabidopsis thaliana, Saintpaulia, petunia, pelargonium, poinsettia, chrysanthemum*, carnation, *zinnia*, poplar, apple, pear, peach, cherry, almond, plum, hazelnuts, banana, apricot, grape, kiwi, mango, melon, *papaya*, walnut, pistachio, raspberry, blackberry, loganberry, blueberry, cranberry, orange, lemon, grapefruit, tangerine, avocado, or cocoa. In an embodiment, a stable dry pheromone composition is provided to promote soil microbials that may directly protect or that may induce plant abiotic and biotic stress resistance wherein when reconstituted the composition comprises from between about 0.0625×HCE and about 0.0227×HCE from the physiologic to about 1×HCE. In some embodiments, the composition comprises up to about 45 nmol of ascr #9, up to 3 nmol of ascr #11, or both.

In an embodiment according to the disclosure, there is provided a method which includes contacting soil around at least one plant, at least one plant, or at least a part of a plant with a composition comprising an effective amount of an isolated ascaroside which increases the abundance of soil microbials that improve plant growth, health and microbial directly protects plant from pests or induce/prime plant abiotic and biotic stress tolerance to one or more abiotic or biotic stresses to which the plant is exposed, wherein the ascaroside is ascr #1, ascr #2, ascr #3, ascr #4, ascr #5, ascr #6, ascr #6.1, ascr #6.2, ascr #7, ascr #8, ascr #9, ascr #10, ascr #11, ascr #12, icas #9, bhas #18, hbas #3, mbas #3, easc #18, oscr #9, and/or combinations thereof. Contacting the soil results in localized plant soil microbials around the plant roots.

Yet in another embodiment, the present disclosure's composition does not include ascr #11, and/or contains non-detectable ascr #11, yet all the composition's function, characteristics and/or methods of making/application remain the same or substantially similar. In an embodiment, the disclosure relates to a method for reducing soil methanogenic microbials levels to reduce greenhouse gases by applying IJs at a density is from about 1-2 billion to about 0.5 million per hectare, and application is on about a 2 week-interval, or by applying a pheromone extract composition comprising up to about 45 nmol of ascr #9, with no and/or non-detectable ascr #11, and a dilution ranging from about 16 to about 44 times in the soil, or by applying an effective amount of at least one isolated ascaroside, where said ascaroside is ascr #1, ascr #2, ascr #3, ascr #4, ascr #5, ascr #6, ascr #6.1, ascr #6.2, ascr #7, ascr #8, ascr #9, ascr #10, ascr #12, icas #9, bhas #18, hbas #3, mbas #3, easc #18, oscr #9, and/or a combination thereof.

Yet in another embodiment, the present disclosure's composition includes only ascr #9, mostly ascr #9, and/or contains non-detectable remaining ascarosides, yet all the composition's function, characteristics and/or methods of making/application remain the same or substantially similar. In an embodiment, the disclosure relates to a method for reducing soil methanogenic microbials levels to reduce greenhouse gases by applying IJs at a density is from about 1-2 billion to about 0.5 million per hectare, and application is on about a 2 week-interval, or by applying a pheromone extract composition comprising up to about 45 nmol of ascr #9, with no and/or non-detectable other ascarosides, and a dilution ranging from about 16 to about 44 times in the soil, or by applying an effective amount of ascr #9.

In one embodiment, the contacting soil or plant promotes the abundance of soil microbials around the roots where microbials parasitize the plant pests and pathogens or produce chemicals that suppress the plant pest and pathogens. In a further embodiment, the contacting results in the soil microbials that produce plant hormones or soil microbials that stimulate plant increasing production of hormones which promote plant growth and abiotic and biotic stress tolerance. The plant hormones may be cytokinins (CKs), abscisic acid (ABA), gibberellins (GAs), Salicyclic acid (SA), Indole acetic acid (IAA), Strigolactone (SL), and/or combinations thereof. In yet a further preferred embodiment, the contacting induces increased production of microbial production of plant hormone selected from the group consisting of: cytokinins (CKs), Salicyclic acid (SA), Indol acetic acid (IAA), abscisic acid (ABA), gibberellins (GAs), Strigolactone (SL), and/or combinations thereof.

In an embodiment, the disclosure relates to a method for controlling or reducing the abundance of a causative agent for green root rot and *Botrytis cinerea* in the soil to protect plants from pests and pathogens. The method comprises applying an effective amount of IJs of beneficial nematodes, where the IJs are in a density from about 1-2 billion to about 0.5 million per hectare, and application is on about a 2 week-interval; or applying an effective amount of a stable dry pheromone composition, comprising up to about 45 nmol of ascr #9, up to 3 nmol of ascr #11, and a dilution ranging from about 16 to about 44 times in the soil, or applying or an effective amount of at least one isolated ascaroside, where said ascaroside is ascr #1, ascr #2, ascr #3, ascr #4, ascr #5, ascr #6, ascr #6.1, ascr #6.2, ascr #7, ascr #8, ascr #9, ascr #10, ascr #11, ascr #12, icas #9, bhas #18, hbas #3, mbas #3, easc #18, oscr #9, or a combination thereof.

In an embodiment, the disclosure relates to a method for reducing soil methanogenic microbials levels to reduce greenhouse gases by applying IJs at a density is from about 1-2 billion to about 0.5 million per hectare, and application is on about a 2 week-interval, or by applying a pheromone extract composition comprising up to about 45 nmol of ascr #9, up to 3 nmol of ascr #11, and a dilution ranging from about 16 to about 44 times in the soil, or by applying an effective amount of at least one isolated ascaroside, where said ascaroside is ascr #1, ascr #2, ascr #3, ascr #4, ascr #5, ascr #6, ascr #6.1, ascr #6.2, ascr #7, ascr #8, ascr #9, ascr #10, ascr #11, ascr #12, icas #9, bhas #18, hbas #3, mbas #3, easc #18, oscr #9, or a combination thereof.

As used herein, the term "about" is defined as plus or minus ten percent of a recited value. For example, about 1.0 g means 0.9 g to 1.1 g. Alternatively, depending on context, the term "about" can be defined as plus or minus of up to fifty percent of a recited value. For example, about 1.0 g means up to between 0.5 g to 1.5 g.

Unless otherwise explained, all technical and scientific terms used herein have the same meaning as commonly understood by one of ordinary skill in the art to which this disclosure belongs. The singular terms "a", "an", and "the" include plural referents unless context clearly indicates otherwise. Similarly, the word "or" is intended to include "and" unless the context clearly indicate otherwise.

Embodiments of the present disclosure are shown and described herein. It will be apparent to those skilled in the art that such embodiments are provided by way of example only. Numerous variations, changes, and substitutions will occur to those skilled in the art without departing from the disclosure. Various alternatives to the embodiments of the disclosure described herein may be employed in practicing the disclosure. It is intended that the included claims define the scope of the disclosure and that methods and structures within the scope of these claims and their equivalents are covered thereby. All publications, patents, and patent applications mentioned in this specification are herein incorporated by reference to the same extent as if each individual publication, patent, or patent application was specifically and individually indicated to be incorporated by reference.

EXAMPLES

Having now generally described this disclosure, the same will be better understood by reference to certain specific examples, which are included herein only to further illustrate the disclosure and are not intended to limit the scope as defined by the claims.

Example 1

Preparation of Analysis of Pheromone Extracts

Pheromone extracts were prepared from insect cadavers and their components analyzed by LC-MS.

Pheromone extracts and partial purification was conducted as described by Srinivasan J. et al. (2008, "A synergistic blend of small molecules differentially regulates both mating behavior and development in *Caenorhabditis elegans*," Nature 454: 1115-1118) with modifications. A total of 33 insect host cadavers (*G. mellonella* larvae) were placed into 70% EtOH and stored at –20° C. until extraction. The insect cadavers were homogenized using 1 g of ceramic zirconium beads (1.25 mm) (ZIRMIL) in 2 mL tubes for 37 seconds using a PRECELLYS24 homogenizer. Samples were centrifuged for 15 minutes at 18400 rcf and the supernatant was lyophilized and resuspended in MILLI-Q water. To facilitate calculations for physiologically relevant concentration of the ascarosides, wax worm volume was estimated at 200 µl; the average weight of wax worms was 232 (+/–57 mg; n=19).

The first reverse-phase solid-phase extraction was performed using SEP-PAK PLUS C18 cartridges (Waters Corporation; Milford, Massachusetts, USA). The initially collected flow through was termed Fraction A. Thereafter, the column was washed with water, collected, and saved. Subsequently, the column was eluted with 50% MeOH (Fraction B) and 90% MeOH (Fraction C). Individual fractions were analyzed by LC-MS. Fraction A contained ascr #9 and ascr #11. Previously, one of the major components, ascr #9, was found to be common in consumed insect host cadavers of *Steinernema* spp. and *Heterorhabditis* spp, and Ascr #11 was found to be common in the consumed insect host cadavers which were infected with *Steinernema* spp. (Kaplan F., et al., 2012, supra). Briefly, insect hosts (*G. mellonella*) were infected with *H. bacteriophora, H. zealandica, H. floridensis, S. carpocapsae, S. riobrave,* or *S. diaprepesi.* When nematodes began to emerge from insect cadavers, they were placed into 1.5 ml of 70% EtOH and stored at –20° C. until use. Thereafter, insect cadavers were homogenized using 1 g of ceramic zirconium beads (1.25 mm) (ZIRMIL) in 2 mL tubes for 39 seconds using a PRECELLYS24 homogenizer. The homogenized cadavers were centrifuged at 3380 rcf for 10 minutes. The supernatant was diluted with 1 mL of HPLC water, placed at –20° C., and then placed into a SPEED VAC centrifuge (Speed Vac Plus SC210A, Savant) overnight. Each cadaver extract was re-suspended in 1 mL of 50% MeOH and centrifuged at 18400 rcf for 15 to 20 minutes. Thereafter, samples were diluted in a 1:1 ratio with 0.1% formic acid, yielding sample pH of 4.2. Presence or absence of ascr #9 was determined by LC-MS.

The results above suggested that the other components of the pheromone extracts can be common in insect host cadavers infected with other *Steinernema* and/or *Heterorhabditis* species. The findings in the disclosure suggest that pheromones individually in the extracts or in combination with the other components can promote soil microbials that can parasitize plant pests and pathogens, that can promote plant growth and health, and that can produce plant hormones that induce plant tolerance to abiotic and biotic stresses such as drought/water deficit, cold heat, immunity to bacterial and fungal viral pathogens.

Example 2

Preparation of Pheromone Extracts

Pheromones were extracted from nematodes and used to prepare compositions that were used to promote soil microbials.

Pheromone extracts were extracted from 1000 *Galleria mellonella* infected with *Steinernema* spp (*S. feltiae* or *S. carpocapsae*) 7 days after nematodes emerged out of the consumed cadavers. The pheromones were extracted with 70% Methanol, dried with a rotary evaporator, then extracted with water, and dried. For *S. carpocapsae* 1 HCE pheromone extracts weighted 1.2 mg and the *S. feltiae,* 1 HCE pheromone extracts weighted 3.4 mg. 1×HCE was resuspended in 200 microliters water.

To promote soil microbials, 34 HCE pheromone extracts were diluted in 110 mL water (0.0625×HCE) and placed within 15 cm surrounding the tree trunk, and then 190 mL of additional water were added. The soil was sampled for soil microbials (fungi and bacteria) before the treatment to show that the starting soil microbiome was the same and after that the soil was sampled for every 2 weeks for 6 weeks. The soil microbial abundance increased for 4 weeks and after that it came back to the same level as untreated controls. Previously, the inventors showed that pheromone activity is lost in 7 to 10 days at room temperature and in 20 to 30 days at 4° C. Since soil temperature varies, the expected degradation of the pheromone extracts was estimated to be 3 weeks. Consistent with the degradation data, the expected positive effect on the soil microbials would disappear after 4 weeks. Therefore, it would be expected that at 6 weeks there would be no difference between untreated control and the pheromone extract treated plots. The pheromone extract treatment can be repeated every 4 weeks to promote beneficial soil microbials to protect plants from soil pest and pathogens like plant parasitic nematodes and insects and pathogens (viral, fungal and bacteria) or other abiotic stresses.

The data presented in this Example shows that a composition comprising extracted pheromones increased the soil microbials in soil surrounding treated trees for at least 4 weeks.

Example 3

Beneficial Effect of Nematode Pheromone Extract

It is anticipated by using the composition and method according to this disclosure, the beneficial soil microbial abundance will increase, protecting the plants directly by parasitizing, suppressing with antibiotic production, or indirectly by producing plant hormones or inducing plant tolerance to abiotic and biotic stresses, and preventing plant damage will be improved by between at least about 1-100%, e.g., by 1%, by 2%, by 5%, by 10%, by 20% by, 30%, by 40%, by 50%, by 60%, by 70%, by 80%, by 90%, by 100%.

Commercial soil microbials can be applied with the pheromone extracts solution (34 HCE pheromone extracts can be diluted in 110 ml water) and placed 15 cm surrounding the tree trunk and then added 190 ml of additional water to extend their abundance for over 4 weeks.

The commercial soil microbials in 300 ml of water containing 34 HCE pheromone extracts (115 mg extracts) can be applied 15 cm surrounding the tree trunk to extend their abundance for over 4 weeks. This will reduce farmers' labor cost.

Commercial beneficial nematodes IJs (*S. carpocapsae* or *S. feltiae* IJs) with a density from 300,000 to 1 million per tree can be applied in an about 15 to 30 cm radius surrounding the tree trunk to extend their abundance for over 2 weeks. For Peachtree borer or other borers 300,000 to 1 million per tree within a 15 to 30 cm radius is good. For general purposes a minimum of about the equivalent of 25 IJs per cm² is a sufficient density.

Example 4

Growing Nematode Conditions

Growing nematodes in insects is considered as in vivo growth, growing nematodes outside the insect just with their symbiotic bacteria in liquid or solid media is considered as in vitro growth.

*Steinernema* or *Heterorhabditis* spp. (*Steinernema carpocapsae, Steinernema feltiae, Steinernema kraussei, Steinernema glaseri, Steinernema scapterisci, Steinernema riobrave, Steinernema kushidai, Steinernema scarabaei* or *Heterorhabditis bacteriophora, Heterorhabditis megidis, Heterorhabditis indica, Heterorhabditis marelata, Heterorhabditis zealandica, Heterorhabditis downesi*) are grown on *Galleria mellonella* larvae (wax worms, wax moth). The ratio of nematodes is 25 to 200 IJs per wax worm larvae. Other insect hosts can be used such as *Tenebrio molitor* (meal worms) larvae navel orangeworm (*Amyelois transitella*), tobacco budworm (*Heliothis virescens*), cabbage looper (*Trichoplusia ni*), pink bollworm (*Pectinophora gossypiella*), beet armyworm (*Spodoptera exigua*), corn earworm (*Helicoverpa zea*), gypsy moth (*Lymantria dispar*), house cricket (*Acheta domesticus*) and various beetles (Coleoptera). After two days, the infected larvae are placed into new 6 cm diameter petri dishes and the white trap method is used to collect IJs. It takes about 7 to 10 days from infection to emergence of IJs. Once IJs form and leave the cadavers (or 3 days after emergence of the IJs), cadavers are collected to extract pheromones.

An average of pheromone extract from *S. feltiae* from one insect host cadaver (HCE) weighs 3.4 mg that can be diluted in 3.2 mL, and 0.04 mL would be used for per seed for seed treatment. So, from 1000 grubs, it is possible to produce 3400 mg of pheromone extracts in 3.2 L.

For the orchards, 34 HCE pheromone extracts (116 mg) can be diluted in 110 mL of water and applied the soil surrounding 15 cm of the tree trunk and the area further watered with 190 mL. The orchard can be treated 3 to 4 weeks prior to planting (an alternative to soil fumigants), at planting, and then once a month to promote soil microbials to protect trees and vegetables from abiotic and biotic stresses and promote plant growth and health.

Alternatively, nematode IJs are introduced to a pure culture of their symbiont in a nutritive medium at optimum growth temperature in a solid agar medium or a liquid culture with aeration in shake flasks, stirred bioreactors, airlift bioreactors (Shapiro-Ilan, D. I., et al., 2012, "Entomopathogenic Nematode Production and Application Technology" J. Nematol. 44(2): 206-217; Inman III. F. L., et. al., 2012, "Mass Production of the Beneficial Nematode *Heterorhabditis bacteriophora* and Its Bacterial Symbiont *Photorhabdus luminescens*," Indian J. Microbiol. 52: 316-324). Media for in vitro approaches is preferably animal product based (e.g., pork kidney or chicken offal) or includes various ingredients such as peptone, yeast extract, eggs, soy flour, and lard. Exemplary in vitro medium recipes for solid or liquid fermentation are disclosed, for example, in McMullen II, J. G. and Stock, S. P. (2014, "In vivo and In vitro Rearing of Entomopathogenic Nematodes (Steinernematidae and Heterorhabditidae)," J. Vis. Exp. (91), e52096, doi:10.3791/52096).

In vitro growth recipes are the same for both liquid and solid medium except for the agar. The liquid medium does not contain agar, solid medium does because agar is the solidifying agent.

For Liver-kidney Agar (for 500 mL): Beef liver (50 g), Beef kidney (50 g), Sodium chloride 2.5 g (0.5% final concentration), Agar, 7.5 g (1.5% agar, final concentration), 500 mL distilled H₂O.

For Lipid Agar (for 1 L): Nutrient broth (8 g), Yeast extract (5 g), Magnesium chloride hexahydrate (10 mL; 0.2 g/mL), Corn oil (4 mL), Corn syrup (96 mL) combine 7 mL corn syrup in 89 mL heated H₂O and swirl for homogeneity, Agar (15 g), Distilled H₂O (890 mL).

Nematode IJs are inoculated into liquid medium with a density between about 3,000 and 4,000 nematodes per mL at 25° C. or 28° C. until nematodes reproduce and form IJs again (about 20 to 60% newly formed IJs). Such cultures may be synchronized cultures or unsynchronized cultures. Once new IJs are formed in the liquid cultures, nematodes are separated from the liquid medium. Medium is then centrifuged to remove the bacteria. The supernatant is spray dried or frozen and lyophilized. The dry medium is extracted with alcohol and dried. Then it is extracted with water and dried. If the starting volume of the medium is 1 L, the dry extract is resuspended with 16 L of water. The liquid pheromone suspension can be applied with drip irrigation in a controlled environment, vertical farming, greenhouses or in the field in the drip irrigation system with or without fertilizers or pesticides at planting or after planting seeds, seedlings, transplants or trees. It can also be applied as a soil amendment 2 to 3 weeks before planting the trees or transplanting vegetables and at planting and thereafter every 4 weeks.

If the beneficial nematodes are used to promote soil microbials, beneficial nematodes should be applied every two weeks to promote soil microbials. They can be applied before planting (pre-planting), at planting and every two weeks after planting for orchard establishment or specialty crops or row crops with irrigation system or fertilizers.

Example 5

Field Trial

The surprising effect of the pheromone extracts on soil microbials was found in a Peach crop field trial.

Table 1 below shows the experimental plan for a field trial. It includes the treatments, replication number, and sampling times.

TABLE 1

| | | | | | |
|---|---|---|---|---|---|
| EXPERIMENTAL PLAN | | | | | |
| | | Before Application | After Application | | |
| Location | Parcels | (1 to 2 days) | (14 days) | (28 days) | (32 days) |
| Georgia, USA | Control (water only) | 4 | 4 | 4 | 4 |
| USDA-ARS | Chlorpyrifos | 4 | 4 | 4 | 4 |
| | Sc IJs | 4 | 4 | 4 | 4 |
| Peach orchard Byron, Georgia | Sc IJs + Sc Pheromone extracts | 4 | 4 | 4 | 4 |
| Total Samples by time point | | 16 | 16 | 16 | 16 |
| Total samples of the study | | 64 | | | |

Bulk soil samples for the microbials (fungal and bacterial analysis) were collected about between 4 and 6 inches (10 to 15 cm) deep compiling a spoonful of soil from the 4 different treatments from the 15 cm from the tree trunks. For each treatment, the first two trees on the southern side of the plot were chosen for sampling. At each tree, 3 cores were taken (South, East, and North side of tree), then the soil from the 6 cores were combined and mixed. A spoonful size sample (using spoon provided) from the mixed and homogenized soil sample were taken to represent the final sample for the replicate. To be fully diligent and to avoid cross-contamination, the digging tools were wiped with ethanol wipes and allowed full drying between samples and gloves were used during sample collections. Samples were shipped to Biome Makers for analysis after collection or the following day. When that was not possible, samples were stored at −20° C. until shipping overnight. Exposure to direct sun, or extreme temperature changes, were always avoided. Soil samples were placed in a cooler with ice packs during collection. Samples were collected at 10 AM in the morning. Location of the sampling: 15 cm from the tree trunk.

To characterize both bacterial and fungal microbial communities associated with soil samples, the 16S rRNA (for prokaryotes) and ITS (for fungi) marker genes were amplified and sequenced. Sequencing was conducted with ILLU-MINA MiSeq technology, and the resulting raw data were analyzed using a Biome Makers' proprietary pipeline. Phylogenetic assignment of each sample was based on an average of 300,000 high-quality raw sequencing reads against a Biome Makers proprietary taxonomically classified sequence database. Computation of functional and ecological indexes were conducted with Biome Makers proprietary software and databases. Biome Makers provided a bionematicide, *Purpureocillium lilacinum*, abundance was increased in response to *S. carpocapsae* IJ 2 weeks after and IJs with pheromone extracts 2 and 4 weeks after. They also provided an abundance of *Trichoderma* ssp., known to produce abscisic acid, a plant hormone that induces abiotic stress tolerance in plants, and parasitize pathogenic fungus in response to the treatments. Furthermore, the Biome Makers' index provided suppression of pathogenic species *alternaria* rot, green fruit rot and *botrytis* rot.

Independently, the fungal and bacterial abundance datasets were analyzed with a statistician from Neyman Consulting LLC firm using R-software. The percent abundance dataset included 620 bacterial species and 1039 fungal species. Principal component analysis (PCA) was performed to test for the presence of differences between untreated and treated (Pheromone extracts and *S carpocapsae* IJs, IJs only and Chlorpyrifos) over 6-week period, assess overall experimental variation, and determine individual time-point variation. As seen in Table 2 below, PCA revealed that the four highest ranking components accounted for more than 84.9% of the total variance within the dataset. Inspection of two of these components explains the variance between 51% and 58%. The data in FIG. 4A to FIG. 4C showed that time had a strong effect on the treatments. After 2 to 4 weeks, the treatment and control show different effects, but the treatment effect went away after 6 weeks. Additionally, T-Test further supported the observations in PCA analysis. At 6 weeks, except for a few fungal species, the fungal abundance was the same as in untreated control at P<0.05 levels. The same pattern was followed by the bacterial abundance dataset. At 6 weeks, the bacterial abundance between treated and untreated samples were very similar.

TABLE 2

PCA COMPONENT LOADINGS OF SC IJS AND
SC PHEROMONE EXTRACT TREATMENTS

| Fungal species | PC1 51.64 | PC2 19.89 | PC3 7.15 | PC4 6.25 | Proportion of Variance (%) |
|---|---|---|---|---|---|
| Biocontrol/potential biocontrol for plant parasitic nematodes and pathogens | | | | | |
| Epicoccum nigrum | −0.02801 | 0.131391 | | | |
| Cladophialophora chaetospira | 0.038624 | −0.03816 | | | |
| Trichoderma spirale | 0.046243 | −0.05835 | | | |
| Acremonium sp. | −0.03025 | 0.031695 | | | |
| Purpureocillium lilacinuni | −0.02796 | −0.00793 | | | |
| Chaetomium sp. | −0.00674 | 0.103051 | | | |
| Soil fungus and agricultural soil inoculant | | | | | |
| Aspergillus terreus | −0.85989 | −0.41745 | | | |
| Scleroderma cepa | −0.0252 | 0.055498 | | | |
| Mycena sp. | −0.05722 | 0.035231 | | | |
| Pathogenic | | | | | |
| Coniothyrium sp. | 0.040971 | −0.04486 | | | |
| Alternaria citri | −0.15332 | 0.682484 | | | |
| Penicillium sp. | −0.04848 | −0.03192 | | | |
| Fusarium solani | 0.000622 | 0.10327 | | | |
| Drechslera sp. | 0.197832 | −0.20679 | | | |
| Penicillium brasilianum | 0.090967 | −0.10116 | | | |
| Coniochaeta cateniformis | −0.08898 | 0.091536 | | | |
| unknown activities | | | | | |
| Devriesia americana | 0.002242 | 0.055157 | | | |
| Pyrenochaetopsis leptospora | 0.200947 | −0.21105 | | | |
| Curvularia affinis | 0.035743 | 0.002442 | | | |
| Tetraploa sasicola | 0.083841 | −0.0864 | | | |
| Tetraploa yakushimensis | 0.097438 | −0.09184 | | | |
| Cladophialophora sp. | 0.31216 | −0.33259 | | | |
| Phialophora livistonae | 0.030709 | −0.02666 | | | |
| Penicillium virgatum | 0.024363 | −0.0264 | | | |
| Arachnomyces minimus | −0.04532 | 0.220059 | | | |
| Holocotylon brandegeeanum | −0.00259 | 0.043177 | | | |
| Lycoperdon norvegicum | −0.06142 | 0.086097 | | | |
| Delicatula integrella | 0.025527 | −0.03408 | | | |
| Luellia cystidiata | 0.03994 | −0.03669 | | | |
| Mortierella camargensis | 0.005074 | 0.067658 | | | |
| Entoloma llimonae | 0.000436 | 0.043559 | | | |

Figure 3B:
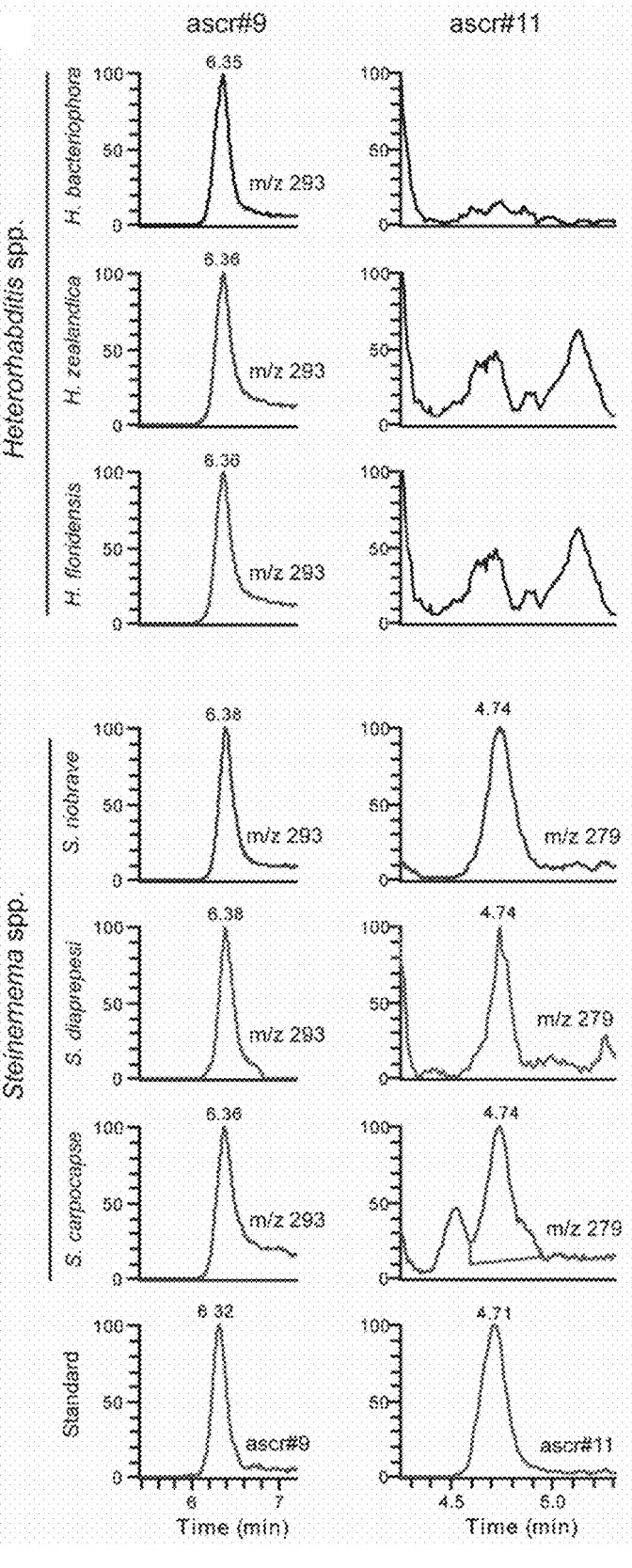

As seen in FIG. 2D, pheromone extracts of 1×HCE contain up to 45 nmol of ascr #9 and up to 3 nmol of ascr #11 when extracted either in MilliQ water or 70% methanol or ethanol. Both ascr #9 and ascr #11 are found in *S. carpocapsae* and *S. feltiae* infected host cadavers. Furthermore, as seen in FIG. 3B, ascr #9 is found in both *Steinernema* spp. and *Heterorhabditis* spp. infected host cadavers which were extracted with 70% Methanol.

Example 6

New Field Trial

The effect of the pheromone extracts on soil microbials was tested again in a Peach crop field trial in Byron, Georgia, USA.

In the trial, four different treatments were applied to the fields. EPN; Pheromone; EPN+Pheromone; and control. Eight (8) different samples were collected for each treatment at three different times: before application (T0); 14 days post-application (T1); and 28 days post-application. The fields were not irrigated during the trial.

Figure 8A:
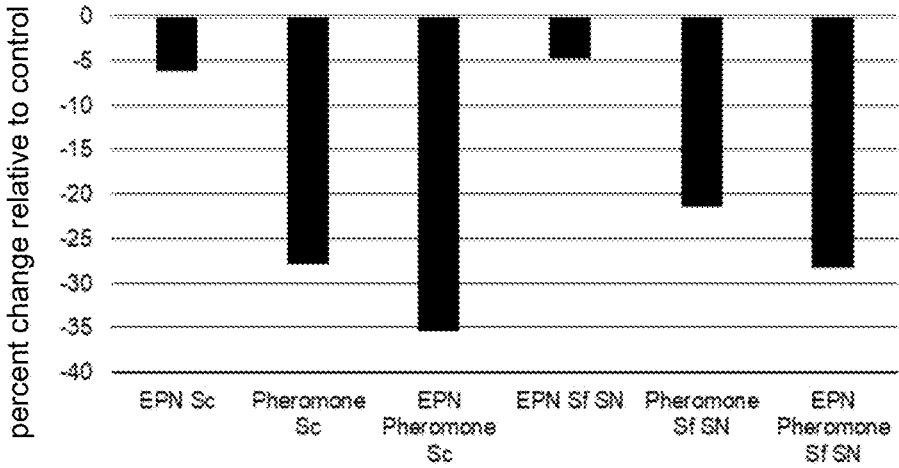
FIG. 8A and FIG. 8B depict graphs of the percent change in microbial abundance for methanogenesis and carbon fixation relative to control.
Figure 8B:
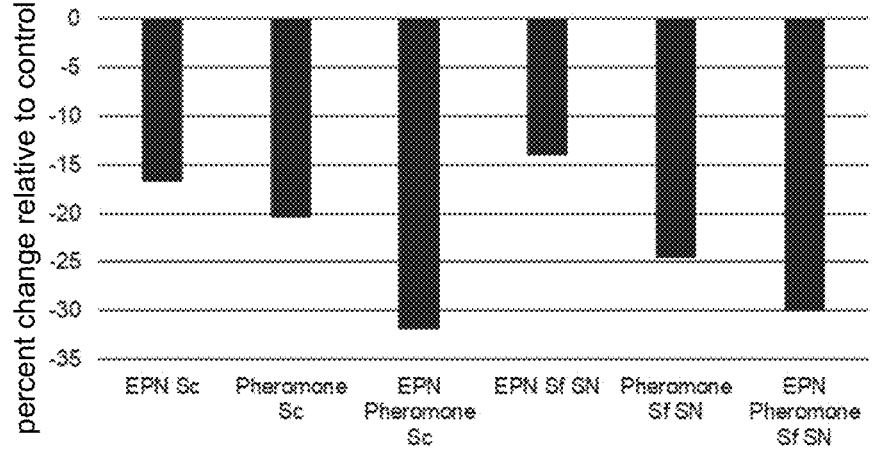

The percent change in the microbial abundance for methanogenesis pathway and the microbial abundance for carbon fixation pathway relative to control is shown in FIG. 8A and FIG. 8B. These figures show that although the EPN effect is lower than the pheromone effect in both pathways, it appears to be additive.

FIG. 9A and FIG. 9B show that pheromone-Sc-treated samples have communities with more auxin-producing microorganisms than control, and that pheromone-Sf SN-treated samples have communities with fewer auxin-producing microorganisms than control. As seen in FIG. 10A and FIG. 10B, unlike the microbial abundance for auxin pathways, the microbial abundance for abscisic acid pathways increase with pheromone-Sf SN treatment, and are consistent at both timepoints.

The inventors showed earlier that Sc IJs and Sc IJs+ pheromone extracts control the causative agent for Green Fruit Rot. FIG. 11 shows that at 14 days post treatment EPN and EPN+pheromone extracts follow the trend.

We claim:

1. A method for promoting increased abundance of soil microbials comprising administering to a plant environment, or contacting a plant, seed, or part of a plant with an effective amount of a composition comprising an ascr #9 and ascr #11 pheromone extract; wherein the composition increases abundance of soil microbials.

2. The method of claim 1, wherein the soil microbials comprise *Purpureocillium lilacinum, Trichoderma spirale, Chaetomium* sp. and/or *Acremonium* sp.

3. The method of claim 1, wherein the plant environment comprises environments surrounding said plant.

4. The method of claim 3, wherein the environments surrounding said plant comprise a hydroponic growth system, soil surrounding said plant, or plant storage system.

\* \* \* \* \*